US012596642B2

(12) United States Patent
Choi

(10) Patent No.: US 12,596,642 B2
(45) Date of Patent: Apr. 7, 2026

(54) PROCESSING-IN-MEMORY DEVICES

(71) Applicant: SK hynix Inc., Icheon-si (KR)

(72) Inventor: Hae Rang Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/939,218

(22) Filed: Nov. 6, 2024

(65) Prior Publication Data

US 2025/0156309 A1 May 15, 2025

(30) Foreign Application Priority Data

Nov. 14, 2023 (KR) ........................ 10-2023-0157394

(51) Int. Cl.
*G06F 12/00* (2006.01)
*G06F 12/02* (2006.01)
(52) U.S. Cl.
CPC ................................ *G06F 12/0223* (2013.01)
(58) Field of Classification Search
CPC ............. G06F 12/0223; G06F 12/0646; G06F 15/7821; G06F 12/023; G06F 3/0658; G06F 9/3004; G06F 9/3012; G06F 9/30189; G06F 9/3824; G06F 12/06; G11C 7/1015; G11C 8/06
See application file for complete search history.

(56) References Cited

U.S. PATENT DOCUMENTS

| | | | | |
|---|---|---|---|---|
| 5,933,856 A | * | 8/1999 | Avsan | C03C 3/066 711/158 |
| 12,282,750 B2 | * | 4/2025 | Song | G06F 7/499 |
| 2021/0208801 A1 | * | 7/2021 | Song | G06F 3/0604 |
| 2022/0244958 A1 | | 8/2022 | Song et al. | |
| 2023/0128183 A1 | | 4/2023 | Kang et al. | |

FOREIGN PATENT DOCUMENTS

| | | | | |
|---|---|---|---|---|
| EP | 4328756 A1 | * | 2/2024 | G06F 12/06 |
| KR | 1020220032808 A | | 3/2022 | |

* cited by examiner

*Primary Examiner* — Shawn X Gu
*Assistant Examiner* — Mohammad S Hasan
(74) *Attorney, Agent, or Firm* — WILLIAM PARK AND ASSOCIATES LTD.

(57) ABSTRACT

A processing-in-memory device includes a memory circuit including a memory circuit including a plurality of memory cells, the memory circuit configured to designate the plurality of memory cells by a plurality of memory addresses, wherein the plurality of memory addresses are allocated to a memory address space in a memory mode, a register configured to be accessed based on a temporary memory address allocated among the plurality of memory addresses in an arithmetic mode, and an arithmetic circuit configured to perform an arithmetic operation using first and second input data to generate arithmetic result data.

21 Claims, 18 Drawing Sheets

FIG.2

MEMORY CIRCUIT (110)

| ADDR_1 | ROW_1 |
| ADDR_2 | ROW_2 |
| ADDR_3 | ROW_3 |
| | ... |
| ADDR_M-1 | ROW_M-1 |
| ADDR_M | ROW_M |
| ADDR_M+1 | ROW_M+1 |
| | ... |
| ADDR_N | ROW_N |

MEMORY ADDRESS SPACE

FIG.5

PROCESSING-IN-MEMORY DEVICES

CROSS-REFERENCE TO RELATED APPLICATIONS

The present application claims priority under 35 U.S.C. § 119 (a) to Korean Patent Application No. 10-2023-0157394, filed in the Korean Intellectual Property Office on Nov. 14, 2023, which application is incorporated herein by reference in its entirety.

BACKGROUND

1. Technical Field

Various embodiments of the present disclosure relate to processing-in-memory (PIM) devices.

2. Related Art

Recently, interest in artificial intelligence (AI) has been rapidly increases not only in the information technology (IT) industry, but also in the overall industries such as finance and medical care. Accordingly, introduction of the artificial intelligence (AI), more precisely, deep learning, is being considered and prototyped in various fields. In general, the deep learning collectively refers to technologies that effectively learn deep neural networks (DNNs) or deep networks with an increased number of layers than existing neural networks and utilize the deep neural networks (DNNs) or deep networks for pattern recognition or inference.

One of the backgrounds and causes of such a wide interest in the deep learning may be the performance improvement of processors that perform arithmetic. To improve the performance of the artificial intelligence (AI), as many as hundreds of layers of neural network are accumulated and learned. Such a trend has continued in recent years, and as a result, the amount of arithmetic required for hardware that actually performs arithmetic has increased exponentially. Moreover, in the case of the existing hardware system in which a memory and a processor are separated, the performance improvement of artificial intelligence hardware is hindered due to limitations in the amount of data communication between the memory and the processor. Recently, to solve this problem, a processing-in-memory device in which arithmetic circuits and memory circuits are integrated in a semiconductor chip itself has been used as a neural network computing device.

SUMMARY

A processing-in-memory (PIM) device according to an embodiment of the present disclosure may include a memory circuit including a plurality of memory cells, the memory circuit configured to designate the plurality of memory cells by a plurality of memory addresses, wherein the plurality of memory addresses are allocated to a memory address space in a memory mode, a register configured to be accessed based on a temporary memory address allocated among the plurality of memory addresses in an arithmetic mode, and an arithmetic circuit configured to perform an arithmetic operation using first and second input data to generate arithmetic result data.

A processing-in-memory (PIM) device according to an embodiment of the present disclosure may include a memory circuit including a plurality of memory cells, the memory circuit configured to designate the plurality of memory cells by a plurality of memory addresses, wherein the plurality of memory addresses are allocated to a memory address space in a memory mode, a register configured to be accessed based on a first temporary memory address allocated among the plurality of memory addresses in an arithmetic mode, and an arithmetic circuit configured to perform an arithmetic operation using first and second input data, based on a second temporary memory address allocated among the plurality of memory addresses to generate arithmetic result data, in the arithmetic mode.

BRIEF DESCRIPTION OF THE DRAWINGS

FIG. 2 is a diagram illustrating a configuration of a memory address space when the PIM device of FIG. 1 operates in a memory mode.

FIG. 5 is a block diagram illustrating a write operation in the memory mode of the PIM device of FIG. 1.

DETAILED DESCRIPTION

In the following description of embodiments, it will be understood that the terms "first" and "second" are intended to identify elements, but not used to define a particular number or sequence of elements. In addition, when an element is referred to as being "connected" or "coupled" to another element, the element may be electrically or mechanically connected or coupled to the other element directly, or may be electrically or mechanically connected or coupled to the other element indirectly with one or more additional elements between the two elements. Moreover, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed.

A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage may correspond to a signal having a logic "low" level. In an embodiment, the logic "high" level may be set as a voltage level which is higher than a voltage level of the logic "low" level. Meanwhile, logic levels of signals may be set to be different or opposite according to an embodiment. For example, a certain signal having a logic "high" level in one embodiment may be set to have a logic "low" level in another embodiment.

Various embodiments of the present disclosure will be described hereinafter in more detail with reference to the accompanying drawings. In various embodiments described below, a dynamic random access memory (DRAM) device is taken as an example of a memory device, but the present disclosure is not limited thereto. For example, the present disclosure is equally applicable to a static random access memory (SRAM) device, a synchronous DRAM (SDRAM) device, a double data rate synchronous DRAM (DDR SDRAM, DDR2 SDRAM, DDR3 SDRAM, etc.) device, a graphics double data rate synchronous DRAM (GDDR, GDDR2, GDDR3, etc.) device, a quad data rate DRAM (QDR DRAM) device, a RAMBUS XDR DRAM (XDR DRAM) device, a fast page mode DRAM (FPM DRAM) device, a video DRAM (VDRAM) device, an extended data output type DRAM (EDO DRAM) device, a burst EDO DRAM (BEDO DRAM) device, a multi-bank DRAM (MDRAM) device, a synchronous graphic RAM (SGRAM) device, and/or other types of DRAM devices.

Figure 1:
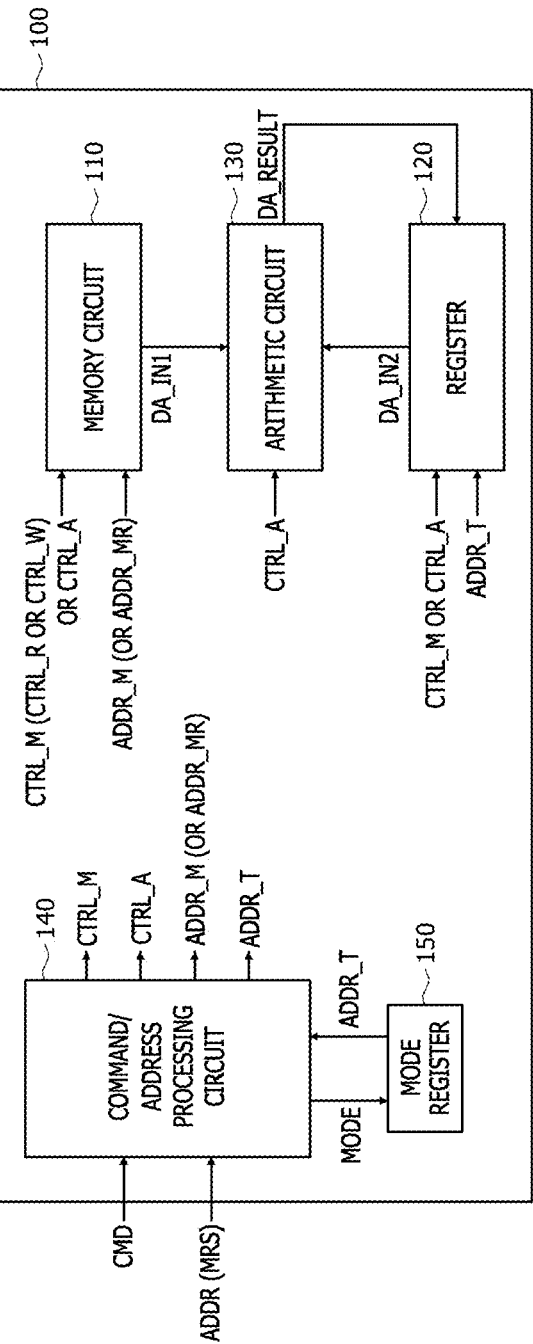
FIG. 1 is a block diagram illustrating a PIM device according to first embodiments of the present disclosure.

FIG. 1 is a block diagram illustrating a PIM device 100 according to first embodiments of the present disclosure.

Referring to FIG. 1, the PIM device 100 may include a memory circuit 110, a register 120, and an arithmetic circuit 130. The PIM device 100 may further include a command/address processing circuit 140 and a mode register 150. The PIM device 100 may operate in a memory mode, or may operate in an arithmetic mode. The PIM device 100 may perform a memory read operation, a memory write operation, a register access operation, and an arithmetic operation. The memory read operation may be an operation of outputting read data stored in the memory circuit 110 to the outside (e.g., a host or a controller) of the PIM device 100. The memory write operation may be an operation of storing write data input from the outside of the PIM device 100 (e.g., a host or a controller) in the memory circuit 110. In this case, the write data may include first input data DA_IN1 used in the arithmetic operation in the arithmetic circuit 130. The register access operation may be an operation of storing second input data DA_IN2 used in the arithmetic operation in the arithmetic circuit 130, may be an operation of providing the second input data DA_IN2 stored in the register 120 to the arithmetic circuit 130, or may be an operation of storing arithmetic result signal DA_RESULT in the register 120. The arithmetic operation may be an operation in which the memory circuit 110 and the register 120 provide the first input data DA_IN1 and the second input data DA_IN2, respectively, to the arithmetic circuit 130, and the arithmetic circuit 130 performs an arithmetic operation using the first input data DA_IN1 and the second input data DA_IN2 to generate the arithmetic result signal DA_RESULT and provides the generated arithmetic result signal DA_RESULT to the register 120. In an embodiment the arithmetic result signal DA_RESULT includes arithmetic result data by the arithmetic circuit 130 performing an arithmetic operation using the first input data DA_IN1 and the second input data DA_IN2. The memory read operation and the memory write operation of the PIM device 100 may be performed in both the memory mode and the arithmetic mode. The register access operation and the arithmetic operation of the PIM device 100 may be performed in the arithmetic mode.

In an embodiment, the memory circuit 110 may be a DRAM device. The memory circuit 110 may include a plurality of memory banks. Each of the plurality of memory banks may include a plurality of memory cells arranged at intersections of a plurality of rows and a plurality of columns. In an embodiment, the plurality of memory cells may be specified by memory addresses ADDR_M. In an embodiment, the memory addresses ADDR_M may include bank addresses, row addresses, and column addresses. The plurality of memory banks may be specified by a plurality of bank addresses. The plurality of rows may be specified by a plurality of row addresses. In addition, the plurality of columns may be specified by a plurality of column addresses.

The memory circuit 110 may receive a memory control signal CTRL_M and the memory address ADDR_M or may receive an arithmetic control signal CTRL_A and the remaining memory address ADDR_MR from the command/address processing circuit 140. Here, the memory address ADDR_M may be defined as one of all memory addresses ADDR_Ms allocated to the memory address space to specify the storage regions of the memory circuit 110. In an embodiment, the plurality of memory addresses ADDR_Ms allocated to the memory address space may be composed of physical addresses allocated to each data storage region (i.e., memory cells) of all data storage regions of the memory circuit 110. In addition, the remaining memory address ADDR_MR may be defined as one of remaining memory addresses ADDR_MRs except the temporary memory address ADDR_T allocated among all the memory addresses ADDR_Ms included in the memory address space in the arithmetic mode. The memory control signal CTRL_M may be a read control signal CTRL_R or a write control signal CTRL_W. The memory address ADDR_M may be one of the plurality of memory addresses ADDR_Ms allocated to the memory address space.

The memory circuit 110 may, in the memory mode, receive the memory control signal CTRL_M and the memory address ADDR_M from the command/address processing circuit 140. The memory circuit 110 may be accessed by the memory control signal CTRL_M and the memory address ADDR_M. In an embodiment, the memory circuit 110 may, in the memory mode, perform the memory read operation of outputting read data stored in the memory cells designated by the memory address ADDR_M to the outside of the PIM device 100 in response to the read control signal CTRL_R. In an embodiment, the memory circuit 110 may, in the memory mode, perform the memory write operation of storing write data in the memory cells designated by the memory address ADDR_M in response to the write control signal CTRL_W. In an embodiment, the write data may be data used in the arithmetic operation performed in the arithmetic circuit 130.

The memory circuit 110 may, in the arithmetic mode, receive the memory control signal CTRL_M or the arithmetic control signal CTRL_A, and the remaining memory address ADDR_MR from the command/address processing circuit 140. In the arithmetic mode, when the memory control signal CTRL_M and the remaining memory addresses ADDR_MR are transmitted from the command/address processing circuit 140, the memory circuit 110 may perform the memory read operation or the memory write operation in the same manner as in the memory mode. That is, the memory circuit 110 may, in the arithmetic mode, perform the memory read operation of outputting read data stored in the memory cells designated by the remaining memory address ADDR_MR to the outside of the PIM device 100 in response to the read control signal CTRL_R. In an embodiment, the memory circuit 110 may, in the arithmetic mode, perform the memory write operation of storing write data in the memory cells designated by the remaining memory address ADDR_MR in response to the write control signal CTRL_W. In the arithmetic mode, when the arithmetic control signal CTRL_A and the memory address ADDR_M are transmitted from the command/address processing circuit 140, the memory circuit 110 may transmit the first input data DA_IN1 stored in the region specified by the remaining memory address ADDR_MR to the arithmetic circuit 130.

The register 120 may store some of arithmetic data used in the arithmetic operation in the arithmetic circuit 130, for example, the second input data DA_IN2. The register 120 may provide the second input data DA_IN2 to the arithmetic circuit 130. In addition, the register 120 may store the arithmetic result data included in the arithmetic result signal DA_RESULT output from the arithmetic circuit 130. In an embodiment, the register 120 may include a plurality of flip-flops providing a plurality of storage spaces. The plurality of storage spaces of the register 120 may be specified by a specific address included in the temporary memory address ADDR_T, for example, the column address.

The register 120 may, in the arithmetic mode, be accessed based on the memory control signal CTRL_M and the temporary address ADDR_T. The register 120 may, in the arithmetic mode, be accessed based on the arithmetic control signal CTRL_A and the temporary memory address ADDR_T. In an embodiment, the register 120 may, in the arithmetic mode, store the second input data DA_IN2 in the storage regions designated by the temporary memory address ADDR_T (particularly, the column address) in response to the memory control signal CTRL_M, for example, the write control signal CTRL_W. Like the first input data DA_IN1, the second input data DA_IN2 may also be some of the data used in the arithmetic operation performed in the arithmetic circuit 130. In an embodiment, the register 120 may, in the arithmetic mode, transmit the second input data DA_IN2 stored in the storage regions designated by the temporary memory address ADDR_T (particularly, the column address) to the arithmetic circuit 130 in response to the arithmetic control signal CTRL_A. In this way, the register 120 might not be accessed by a separate command CMD for register access, but may be accessed by the memory control signal CTRL_M generated from the command CMD used for memory access. Accordingly, in an embodiment, the host or controller controlling the PIM device 100 might not need to have a separate command set for accessing the register 120.

The arithmetic circuit 130 may, in the arithmetic mode, perform the arithmetic operation in response to the arithmetic control signal CTRL_A. In an embodiment, the arithmetic circuit 130 may be a multiplication and accumulation (MAC) circuit. The arithmetic circuit 130 may receive the first input data DA_IN1 and the second input data DA_IN2 from the memory circuit 110 and the register 120, respectively. The arithmetic circuit 130 may, in the arithmetic mode, perform the arithmetic operation using the first input data DA_IN1 and the second input data DA_IN2 in response to the arithmetic control signal CTRL_A. In an embodiment, the arithmetic circuit 130 may, in the arithmetic mode, transmit the arithmetic result data included in the arithmetic result signal DA_RESULT generated by the arithmetic operation, in response to the arithmetic control signal CTRL_A.

The command/address processing circuit 140 may receive the command CMD and the address ADDR from, for example, a host or a controller. In an embodiment, the address ADDR transmitted to the command/address processing circuit 140 may include mode setting information MRS. The command/address processing circuit 140 may process the command CMD to generate and output the memory control signal CTRL_M or the arithmetic control signal CTRL_A. In an embodiment, when the command CMD is a read command, the command/address processing circuit 140 may generate and output the read control signal CTRL_R as the memory control signal CTRL_M. When the command CMD is a write command, the command/address processing circuit 140 may generate and output the write control signal CTRL_W as the memory control signal CTRL_M. When the command CMD is an arithmetic command, the command/address processing circuit 140 may generate and output the arithmetic control signal CTRL_A.

The operation of generating and outputting the memory control signal CTRL_M in the command/address processing circuit 140 may be performed in the same manner in the memory mode and in the arithmetic mode. However, the object to which the command/address processing circuit 140 transmits the memory control signal CTRL_M may be different in the memory mode and in the arithmetic mode. Specifically, in the memory mode, the command/address processing circuit 140 may transmit the memory control signal CTRL_M to the memory circuit 110, but might not transmit the memory control signal CTRL_M to the register 120. On the other hand, in the arithmetic mode, the command/address processing circuit 140 may transmit the memory control signal CTRL_M to the memory circuit 110 or to the register 120 depending on whether the memory address ADDR_M corresponds to the temporary memory address ADDR_T. Specifically, when the memory address ADDR_M is the temporary memory address ADDR_T, the command/address processing circuit 140 may transmit the memory control signal CTRL_M to the register 120. On the other hand, when the memory address ADDR_M is not the temporary memory address ADDR_T (i.e., the memory address ADDR_M is the remaining address ADDR_MR), the command/address processing circuit 140 may transmit the memory control signal CTRL_M to the memory circuit 110.

The command/address processing circuit 140 may, in the memory mode, latch the address ADDR transmitted from a host or a controller, and output the latched address ADDR as the memory address ADDR_M. In the memory mode, the command/address processing circuit 140 may transmit the memory address ADDR_M to the memory circuit 110. The command/address processing circuit 140 may, in the arithmetic mode, latch the address ADDR transmitted from the host or controller, and output the latched address ADDR as the temporary memory address ADDR_T or as the remaining memory address ADDR_MR. Specifically, in the arithmetic mode, when the address ADDR transmitted to the command/address processing circuit 140 is the temporary memory address ADDR_T, the command/address processing circuit 140 may transmit the temporary memory address ADDR_T to the register 120. In the arithmetic mode, when the address ADDR transmitted to the command/address processing circuit 140 is the remaining memory address ADDR_MR, the command/address processing circuit 140 may transmit the remaining memory address ADDR_MR to the memory circuit 110.

When the address ADDR transmitted from the command/address processing circuit 140 includes the mode setting information MRS, the command/address processing circuit 140 may transmit a mode signal MODE corresponding to the mode setting information MRS to the mode register 150. When the mode setting information MRS includes activation of the memory mode, the command/address processing circuit 140 may transmit a memory mode signal as the mode signal MODE to the mode register 150. On the other hand, when the mode setting information MRS includes activation of the arithmetic mode, the command/address processing circuit 140 may transmit an arithmetic mode signal as the mode signal MODE to the mode register 150. When transmitting the memory mode signal as the mode signal MODE to the mode register 150, the command/address processing circuit 140 may continue to operate in the memory mode until transmitting the arithmetic mode signal as the next mode signal MODE to the mode register 150. Similarly, when transmitting the arithmetic mode signal as the mode signal MODE to the mode register 150, the command/address processing circuit 140 may continue to operate in the arithmetic mode until transmitting the memory mode signal as the next mode signal MODE to the mode register 150. When the mode signal MODE is the arithmetic mode signal, the command/address processing circuit 140 may receive the temporary memory address ADDR_T from the mode register 150. Accordingly, in the arithmetic mode, the command/address processing circuit 140 may determine whether the address in the arithmetic mode corresponds to the temporary memory address ADDR_T or the remaining memory address ADDR_MR. [FIG. 1, original paragraph 32 states that a mode signal MODE is sent to the mode register 150. However, this is not shown in FIG. 1. Perhaps we want to illustrate MODE being sent to element 150 in the figure to match its description.

The mode register 150 may set the operation mode of the PIM device 100. The operation mode may be the memory mode or the arithmetic mode. The mode register 150 may set the operation mode of the PIM device 100, based on the mode signal MODE transmitted from the command/address processing circuit 140. In an embodiment, when the memory mode signal is transmitted as the mode signal MODE from the command/address processing circuit 140, the mode register 150 may switch the operation mode from the existing arithmetic mode to the memory mode. When the arithmetic mode is transmitted as the mode signal MODE from the command/address processing circuit 140, the mode register 150 may switch the operation mode from the existing memory mode to the arithmetic mode. In this case, the mode register 150 may transmit the temporary memory address ADDR_T to the command/address processing circuit 140. In an embodiment, the temporary memory address ADDR_T may be set in the mode register 150 in advance.

In an embodiment, the temporary memory address ADDR_T may be a memory address having a specific row address among all the memory addresses ADDR_Ms included in the memory address space.

FIG. 2 is a diagram illustrating a configuration of the memory address space when the PIM device 100 of FIG. 1 operates in the memory mode. In addition, FIG. 3 is a diagram illustrating a configuration of the memory address space when the PIM device 100 of FIG. 1 operates in the arithmetic mode.

Figure 3:
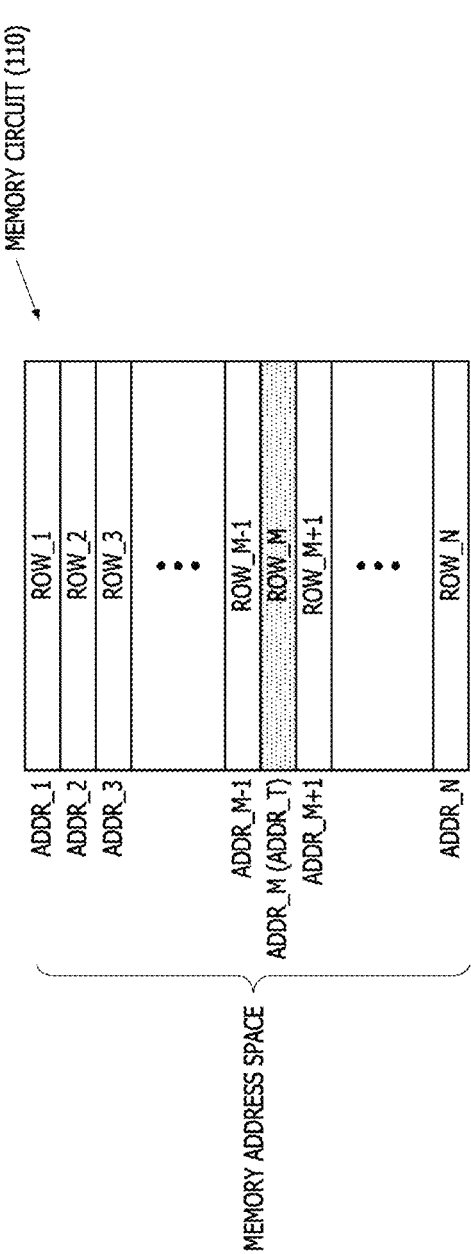
FIG. 3 is a diagram illustrating a configuration of a memory address space when the PIM device of FIG. 1 operates in an arithmetic mode.

Referring to FIGS. 2 and 3, the memory circuit 110 may include a plurality of storage regions. In the present embodiment, a case where the plurality of storage regions included in the memory circuit 110 are a plurality rows, for example, "N" ("N" is a natural number) rows (hereinafter, first to "N"$^{th}$ rows) ROW_1-ROW_N will be taken as an example. Accordingly, the first to "N"$^{th}$ rows ROW_1-ROW_N of the memory circuit 110 may be specified by the first to "N"$^{th}$ row addresses, respectively. Hereinafter, it is assumed that the first to "N"$^{th}$ memory addresses ADDR_1-ADDR_N each include first to "N"$^{th}$ row addresses. That is, the first memory address ADDR_1 may include the first row address that specifies the first row ROW_1. The second memory address ADDR_2 may include the second row address that specifies the second row ROW_2. The third memory address ADDR_3 may include the third row address that specifies the third row ROW_3. The "M"$^{th}$ ("M" is a natural number greater than 3 and less than "N") memory address ADDR_M may include the "M"$^{th}$ row address that specifies the "M"$^{th}$ row ROW_M. In addition, the "N"$^{th}$ memory address ADDR_N may include the "N"$^{th}$ row address that specifies the "N"$^{th}$ row ROW_N. The first to "N"$^{th}$ memory addresses ADDR_1-ADDR_N may all be allocated to the memory address space.

When the PIM device (100 in FIG. 1) operates in the memory mode, as shown in FIG. 2, all rows of the memory circuit 110, that is, the first to "N"$^{th}$ rows ROW_1-ROW_N, may be respectively specified by the all memory addresses allocated to the memory address space, that is, the first to "N"$^{th}$ memory addresses ADDR_1-ADDR_N. On the other hand, when the PIM device (100 in FIG. 1) operates in the arithmetic mode, as shown in FIG. 3, any one memory address among all memory addresses allocated to the memory address space, that is, the first to "N"$^{th}$ memory addresses ADDR_1-ADDR_N, for example, the "M"$^{th}$ memory address including the "M"$^{th}$ row address ADDR_M may be designated as the temporary memory address ADDR_T. That is, the "M"$^{th}$ memory address ADDR_M may commonly include the "M"$^{th}$ row address even if the bank address and column address are different. In this case, the "M"$^{th}$ row ROW_M specified by the "M"$^{th}$ memory address ADDR_M among the first to "N"$^{th}$ rows ROW_1-ROW_N of the memory circuit 110 may be deactivated. Accordingly, the first to "M−1"$^{th}$ rows ROW_1-ROW_M−1 and the "M+1"$^{th}$ to "N"$^{th}$ rows ROW_M+1-ROW_N of the memory circuit 110 may be respectively specified by the remaining memory addresses (ADDR_MRs in FIG. 1) except the "M"$^{th}$ memory address ADDR_M designated as the temporary memory address ADDR_T among all memory addresses allocated to the memory address space, that is, the first to "N"$^{th}$ memory addresses ADDR_1-ADDR_N, that is the first to "M−1"$^{th}$ memory addresses ADDR_1-ADDR_M−1 and the "M+1"$^{th}$ to "N"$^{th}$ memory addresses ADDR_M+1-ADDR_N.

Figure 4:
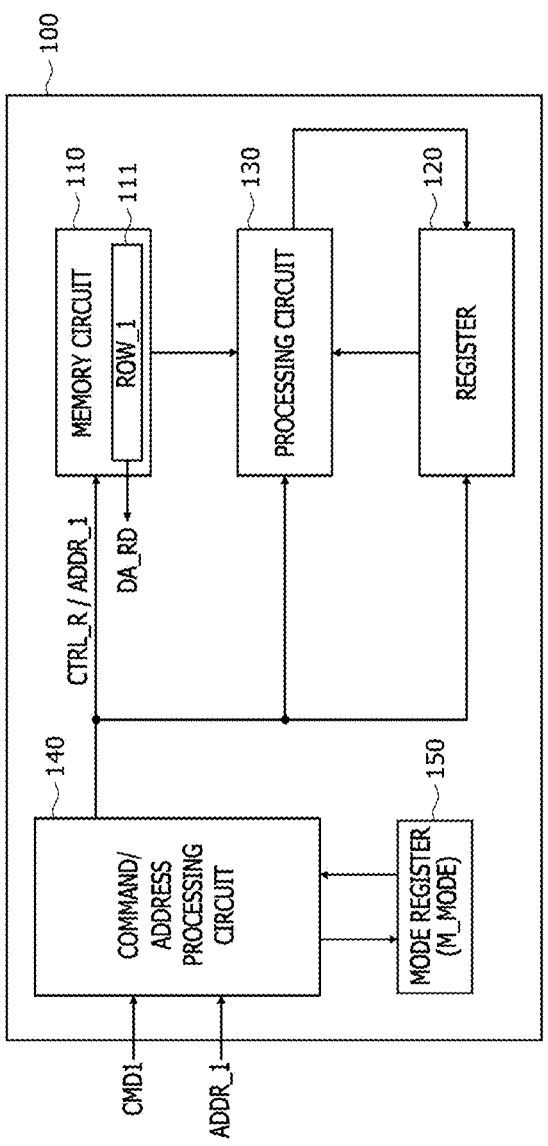
FIG. 4 is a block diagram illustrating a read operation in the memory mode of the PIM device of FIG. 1.

FIG. 4 is a block diagram illustrating a read operation in the memory mode of the PIM device 100 of FIG. 1. In FIG. 4, the same reference numerals as in FIG. 1 indicate the same components. In the present embodiment, it is assumed that the operation mode in the mode register 150 is set to the memory mode M_MODE. Accordingly, the command/address processing circuit 140 may perform command and address processing in the memory mode. As described with reference to FIG. 2, in the memory mode, all rows of the memory circuit 110, that is, the first to "N"$^{th}$ rows ROW_1-ROW_N may be specified by the first to "N"$^{th}$ memory addresses ADDR_1-ADDR_N, respectively.

Referring to FIG. 4, in the memory mode in which the memory mode M_MODE is set in the mode register 150, when a first command CMD1 requesting a read operation and the first memory address ADDR_1 including the first row address are transmitted, the command/address processing circuit 140 may output a read control signal CTRL_R corresponding to the first command CMD1 as the memory control signal (CTRL_M in FIG. 1). The command/address processing circuit 140 may transmit the read control signal CTRL_R to the memory circuit 110. The command/address processing circuit 140 may latch the first memory address ADDR_1, and then may transmit the latched first memory address ADDR_1 to the memory circuit 110. The memory circuit 110 may output read data DA_RD stored in the first row ROW_1 specified by the first memory address ADDR_1. Although not shown in the drawing, the read data DA_RD output from the memory circuit 110 may be output outside the PIM device 100. The read operation in the memory mode according to the present embodiment may be applied in the same manner even when the second to "N"$^{th}$ memory addresses ADDR_2-ADDR_N including the second to "N"$^{th}$ row addresses are transmitted instead of the first memory address ADDR_1 including the first row address.

Figure 5:
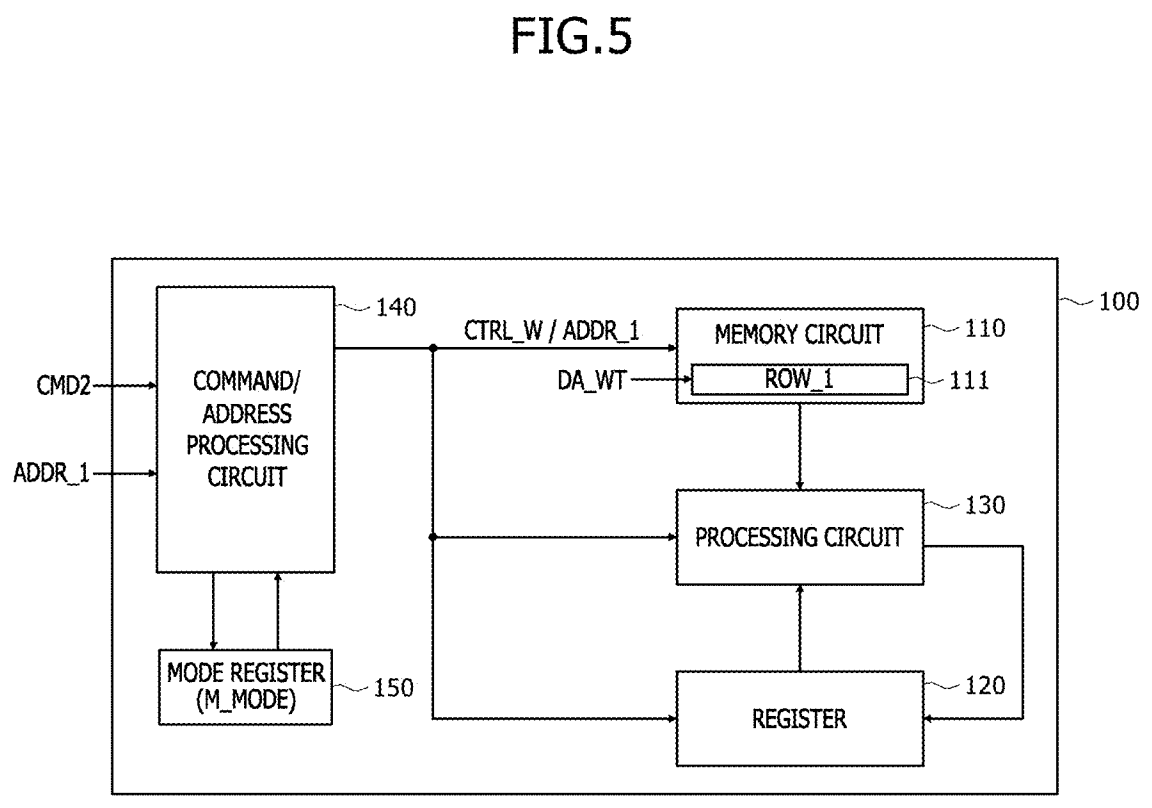

FIG. 5 is a block diagram illustrating a write operation in the memory mode of the PIM device 100 of FIG. 1. In FIG. 5, the same reference numerals as in FIG. 1 indicate the same components. In the present embodiment as well, it is assumed that the operation mode in the mode register 150 is set to the memory mode M_MODE. Accordingly, the command/address processing circuit 140 may perform the command and address processing in the memory mode. As described with reference to FIG. 2, in the memory mode, all rows of the memory circuit 110, that is, the first to "N"$^{th}$ rows ROW_1-ROW_N, of the memory circuit 110 may be respectively specified by the first to "N"$^{th}$ memory addresses ADDR_1-ADDR_N.

Referring to FIG. 5, in the memory mode in which the memory mode M_MODE is set in the mode register 150 as the operation mode, when a second command CMD2 requesting a write operation and the first memory address ADDR_1 including the first row address are transmitted, the command/address processing circuit 140 may output the write control signal CTRL_W corresponding to the second command CMD2 as the memory control signal (CTRL_M in FIG. 1). The command/address processing circuit 140 may transmit the write control signal CTRL_W to the memory circuit 110. The command/address processing circuit 140 may latch the first memory address ADDR_1, and then transmit the latched first memory address ADDR_1 to the memory circuit 110. The memory circuit 110 may store write data DA_WT transmitted from outside of the PIM device 100 in the first row ROW_1 specified by the first memory address ADDR_1 (i.e., the first row address). In an embodiment, the write data DA_WT may be the first input data (DA_IN1 in FIG. 1) used in the arithmetic operation in the arithmetic circuit 130. The write operation in the memory mode according to the present embodiment may be applied in the same manner even when the second to "N"$^{th}$ memory addresses ADDR_2-ADDR_N are transmitted instead of the first memory address ADDR_1.

Figure 6:
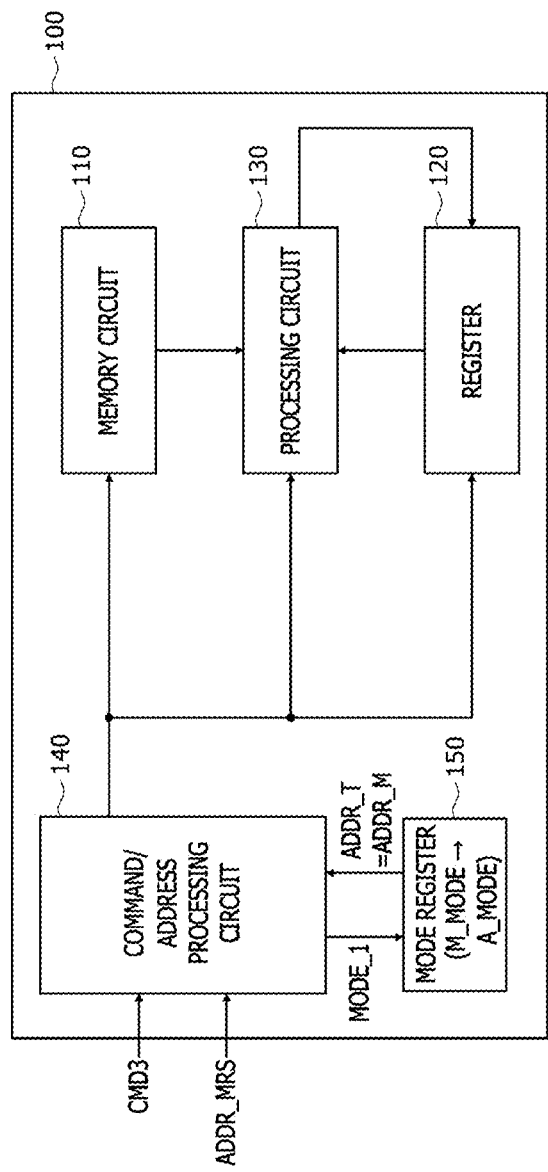
FIG. 6 is a block diagram illustrating a process in which the operation mode of the PIM device of FIG. 1 is changed from the memory mode to the arithmetic mode.

FIG. 6 is a block diagram illustrating a process in which the operation mode of the PIM device 100 of FIG. 1 is changed from the memory mode to the arithmetic mode. In FIG. 6, the same reference numerals as in FIG. 1 indicate the same components.

Referring to FIG. 6, in a state in which the memory mode M_MODE is set as the current operation mode of the mode register 150, when a third command CMD3 requesting a mode change and a memory address ADDR_MRS including mode setting information are transmitted, the command/address processing circuit 140 may transmit a first mode signal MODE_1 to the mode register 150. The mode register 150 may change the operation mode stored in the mode register 150 from the memory mode M_MODE to the arithmetic mode A_MODE in response to the first mode signal MODE_1. In addition, the mode register 150 may transmit the "M"$^{th}$ memory address ADDR_M including the "M"$^{th}$ row address as the temporary memory address ADDR_T to the command/address processing circuit 140. The command/address processing circuit 140 may process subsequently transmitted commands and addresses in the arithmetic mode. In the arithmetic mode, the memory address space may be changed to a state in which the "M"$^{th}$ memory address ADDR_M, which specifies the "M"$^{th}$ row ROW_M of the memory circuit 110, is allocated as the temporary memory address ADDR_T, as described with reference to FIG. 3.

Figure 7:
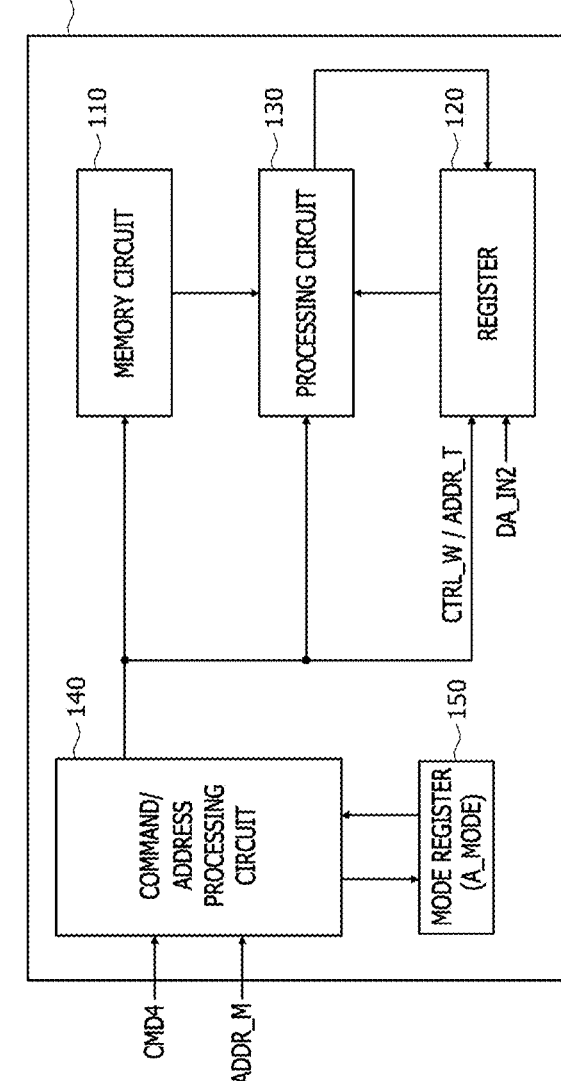
FIG. 7 is a block diagram illustrating a register access operation in the arithmetic mode of the PIM device of FIG. 1.

FIG. 7 is a block diagram illustrating a register access operation in the arithmetic mode of the PIM device 100 of FIG. 1. In FIG. 7, the same reference numerals as in FIG. 1 indicate the same components. In the present embodiment, it is assumed that the operation mode in the mode register 150 is set to the arithmetic mode A_MODE. Accordingly, the command/address processing circuit 140 may perform the command and address processing in the arithmetic mode. As described with reference to FIG. 3, in the arithmetic mode, the first to "M−1"$^{th}$ rows ROW_1-ROW_M−1 and the "M+1"$^{th}$ to "N"$^{th}$ rows ROW_M+1-ROW_N of the memory circuit 110 may be respectively specified by the remaining memory addresses (ADDR_MRs in FIG. 1) except the "M"$^{th}$ memory address ADDR_M, which is the temporary memory address ADDR_T, that is, the first to "M−1"$^{th}$ memory addresses ADDR_1-ADDR_M−1 and the "M+1"$^{th}$ to "N"$^{th}$ memory addresses ADDR_M+1-ADDR_N.

Referring to FIG. 7, in the arithmetic mode in which the arithmetic mode A_MODE is set in the mode register 150 as the operation mode, a fourth command CMD4 requesting a write operation and the "M"$^{th}$ memory address ADDR_M including the "M"$^{th}$ row address are transmitted, the command/address processing circuit 140 may output the write control signal CTRL_W corresponding to the fourth command CMD4 as the memory control signal (CTRL_M in FIG. 1). Because the "M"$^{th}$ memory address ADDR_M corresponds to the temporary memory address ADDR_T, the command/address processing circuit 140 may transmit the write control signal CTRL_W to the register 120 rather than the memory circuit 110. The command/address processing circuit 140 may latch the "M"$^{th}$ memory address ADDR_M, and then transmit the latched "M"$^{th}$ memory address ADDR_M to the register 120. The register 120 may store the second input data DA_IN2 transmitted from outside the PIM device 100. In an embodiment, the storage region in the register 120 where the second input data DA_IN2 is stored may be specified by a column address included in the "M"$^{th}$ memory address ADDR_M.

Figure 8:
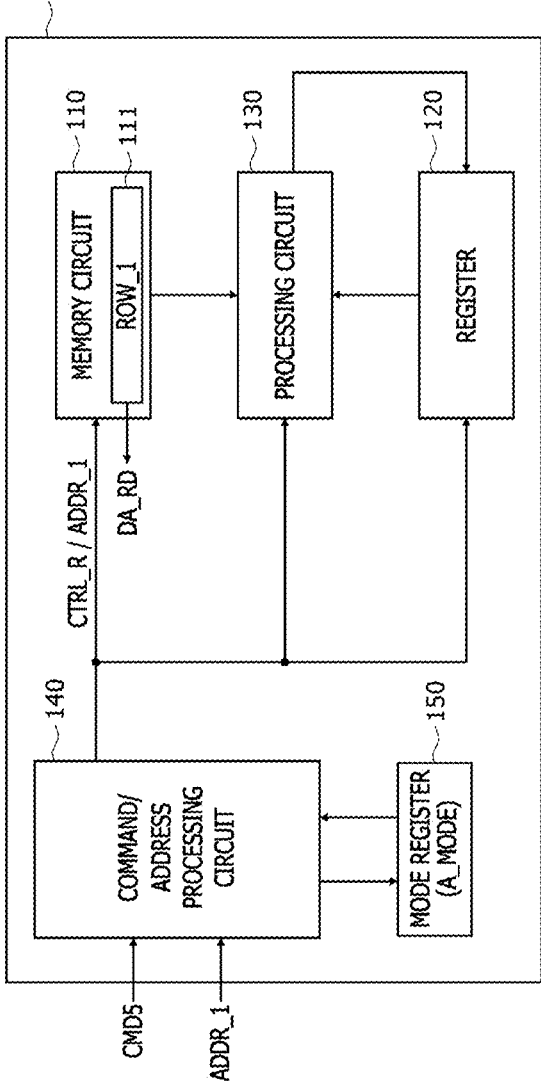
FIG. 8 is a block diagram illustrating an example of a memory circuit access operation in the arithmetic mode of the PIM device of FIG. 1.

FIG. 8 is a block diagram illustrating an example of a memory circuit access operation in the arithmetic mode of the PIM device 100 of FIG. 1. In FIG. 8, the same reference numerals as in FIG. 1 indicate the same components. In this embodiment, it is assumed that the operation mode in the mode register 150 is set to the arithmetic mode A_MODE. Accordingly, the command/address processing circuit 140 may perform the command and address processing in the arithmetic mode. As described with reference to FIG. 3, in the arithmetic mode, the first to "M−1"$^{th}$ rows ROW_1-ROW_M−1 and the "M+1"$^{th}$ to "N"$^{th}$ rows ROW_M+1-ROW_N of the memory circuit 110 may be respectively specified by the remaining memory addresses (ADDR_MRs in FIG. 1) except the "M"$^{th}$ memory address ADDR_M, which is the temporary memory address ADDR_T, that is, the first to "M−1"$^{th}$ memory addresses ADDR_1-ADDR_M−1 and the "M+1"$^{th}$ to "N"$^{th}$ memory addresses ADDR_M+1-ADDR_N.

Referring to FIG. 8, in the arithmetic mode in which the arithmetic mode A_MODE is set in the mode register 150 as the operation mode, when the first memory address ADDR_1 including the first row address and a fifth command CMD5 requesting a read operation are transmitted, the command/address processing circuit 140 may output a read control signal CTRL_R corresponding to the fifth command CMD5 as the memory control signal (CTRL_M in FIG. 1). Because the first memory address ADDR_1 is not the "M"$^{th}$ memory address ADDR_M, which is the temporary address ADDR_T (i.e., because the first memory address ADDR_1 corresponds to one of the remaining memory addresses (ADDR_MRs in FIG. 1)), the command/address processing circuit 140 may transmit the read control signal CTRL_R to the memory circuit 110 rather than the register 120. Likewise, because the first memory address ADDR_1 does not correspond to the temporary memory address ADDR_T, the command/address processing circuit 140 may latch the first memory address ADDR_1, and then transmit the latched first memory address ADDR_1 to the memory circuit 110. The memory circuit 110 may output the read data DA_RD stored in the first row ROW_1 specified by the first memory address ADDR_1. The read operation of the memory circuit 110 in the arithmetic mode according to the present embodiment may be applied in the same manner even when the remaining memory addresses (ADDR_MRs in FIG. 1), that is, the second to "N−1"$^{th}$ memory addresses ADDR_1-ADDR_M−1 and the "M+1"$^{th}$ to "N"$^{th}$ memory addresses ADDR_M+1-ADDR_N are transmitted instead of the first memory address ADDR_1.

Figure 9:
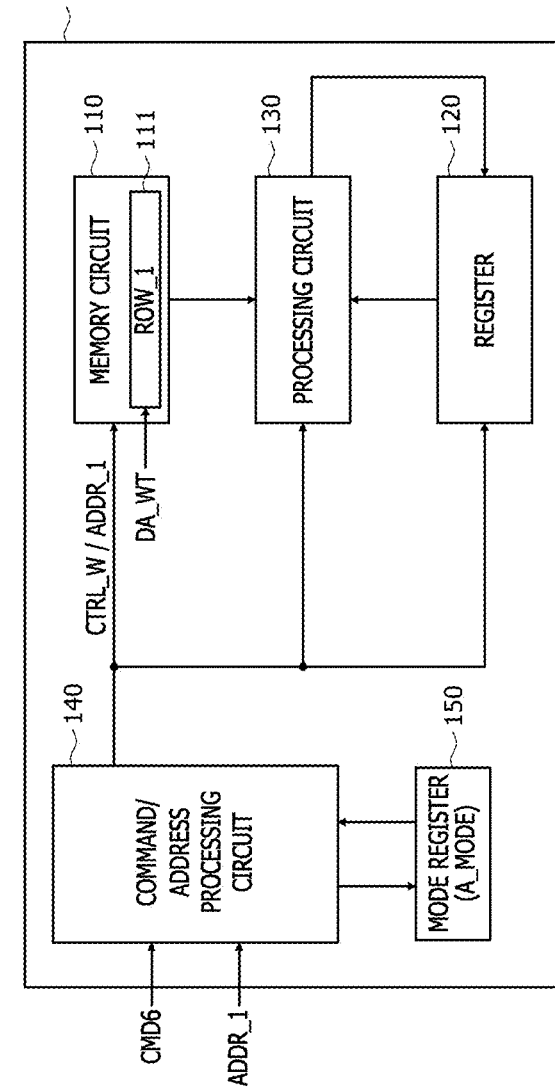
FIG. 9 is a block diagram illustrating another example of the memory circuit access operation in the arithmetic mode of the PIM device of FIG. 1.

FIG. 9 is a block diagram illustrating another example of the memory circuit access operation in the arithmetic mode of the PIM device 100 of FIG. 1. In FIG. 9, the same reference numerals as in FIG. 1 indicate the same components. In this embodiment as well, it is assumed that the operation mode in the mode register 150 is set to the arithmetic mode A_MODE. Accordingly, the command/address processing circuit 140 may perform the command and address processing in the arithmetic mode. As described with reference to FIG. 3, in the arithmetic mode, the first to "M−1"$^{th}$ rows ROW_1-ROW_M−1 and the "M+1"$^{th}$ to "N"$^{th}$ rows ROW_M+1-ROW_N of the memory circuit 110 may be respectively specified by the remaining memory addresses (ADDR_MRs in FIG. 1) except the "M"$^{th}$ memory address ADDR_M, which is the temporary memory address ADDR_T, that is, the first to "M−1"$^{th}$ memory addresses ADDR_1-ADDR_M−1 and the "M+1"$^{th}$ to "N"$^{th}$ memory addresses ADDR_M+1-ADDR_N.

Referring to FIG. 9, in the arithmetic mode in which the arithmetic mode A_MODE is set in the mode register 150 as the operation mode, when the first memory address ADDR_1 including the first row address and a sixth command CMD6 requesting a write operation are transmitted, the command/address processing circuit 140 may output the write control signal CTRL_W corresponding to the sixth command CMD6 as the memory control signal (CTRL_M in FIG. 1). Because the first memory address ADDR_1 is not the "M"$^{th}$ memory address ADDR_M, which is the temporary memory address ADDR_T (i.e., because the first memory address ADDR_1 corresponds to one of the remaining memory addresses (ADDR_MRs in FIG. 1)), the command/address processing circuit 140 may transmit the write control signal CTRL_W to the memory circuit 110 rather than the register 120. Likewise, because the first memory address ADDR_1 does not correspond to the temporary memory address ADDR_T, the command/address processing circuit 140 may latch the first memory address ADDR_1, and then transmit the latched first memory address ADDR_1 to the memory circuit 110. The memory circuit 110 may store the write data DA_WT in the first row ROW_1 specified by the first memory address ADDR_1. The write operation of the memory circuit 110 in the arithmetic mode according to the present embodiment may be applied in the same manner even when the remaining memory addresses (ADDR_MRS in FIG. 1), that is, the second to "M−1"$^{th}$ memory addresses ADDR_1-ADDR_M−1 and the "M+1"$^{th}$ to "N"$^{th}$ memory addresses ADDR_M+1-ADDR_N are transmitted instead of the first memory address ADDR_1.

Figure 10:
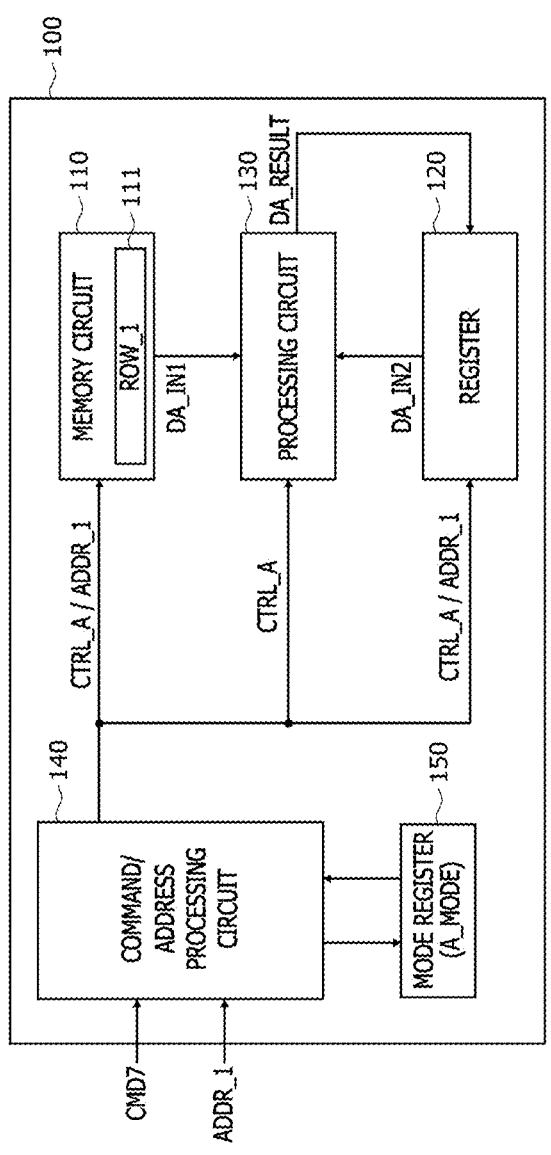
FIG. 10 is a block diagram illustrating an arithmetic operation in the arithmetic mode of the PIM device of FIG. 1.

FIG. 10 is a block diagram illustrating an arithmetic operation in the arithmetic mode of the PIM device 100 of FIG. 1. In FIG. 10, the same reference numerals as in FIG. 1 indicate the same components. In the present embodiment as well, it is assumed that the operation mode in the mode register 150 is set to the arithmetic mode A_MODE. Accordingly, the command/address processing circuit 140 may perform the command and address processing in the arithmetic mode. As described with reference to FIG. 3, in the arithmetic mode, the first to "M−1"$^{th}$ rows ROW_1-ROW_M−1 and the "M+1"$^{th}$ to "N"$^{th}$ rows ROW_M+1-ROW_N of the memory circuit 110 may be respectively specified by the remaining memory addresses (ADDR_MRs in FIG. 1) except the "M"$^{th}$ memory address ADDR_M, which is the temporary memory address ADDR_T, that is, the first to "M−1"$^{th}$ memory addresses ADDR_1-ADDR_M−1 and the "M+1"$^{th}$ to "N"$^{th}$ memory addresses ADDR_M+1-ADDR_N.

Referring to FIG. 10, in the operation mode in which the arithmetic mode A_MODE is set in the mode register 150 as the operation mode, when the first memory address ADDR_1 including the first row address and a seventh command CMD7 requesting the arithmetic operation are transmitted, the command/address processing circuit 140 may transmit the arithmetic control signal CTRL_A corresponding to the seventh command CMD7 to the memory circuit 110, the register 120, and the arithmetic circuit 130. The command/address processing circuit 140 may latch the first memory address ADDR_1, and then transmit the latched first memory address ADDR_1 to the memory circuit 110 and the register 120. The memory circuit 110 may transmit the first input data DA_IN1 stored in the first row ROW_1 specified by the first memory address ADDR_1 to the arithmetic circuit 130 in response to the arithmetic control signal CTRL_A. Similarly, the register 120 may transmit the second input data DA_IN2 stored in the storage region specified by the first memory address ADDR_1 to the arithmetic circuit 130 in response to the arithmetic control signal CTRL_A. The arithmetic circuit 130 may perform the arithmetic operation using the first input data DA_IN1 and the second input data DA_IN2, and output arithmetic result data DA_RESULT generated as a result of the arithmetic operation. In an embodiment, the arithmetic result data DA_RESULT may be transmitted from the arithmetic circuit 130 to the register 120.

Figure 11:
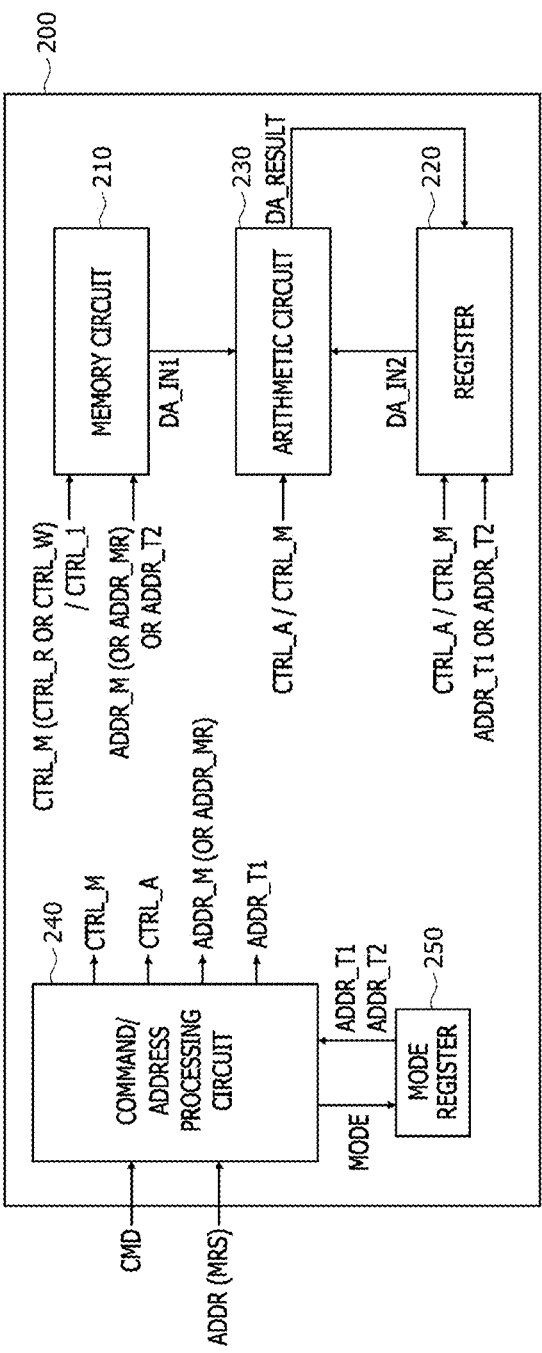
FIG. 11 is a block diagram illustrating a PIM device according to second embodiments of the present disclosure.

FIG. 11 is a block diagram illustrating a PIM device 200 according to second embodiments of the present disclosure. The PIM device 200 according to the present embodiment may be different from the PIM device 100 described with reference to FIG. 1 in that the arithmetic circuit can also perform the arithmetic operation through the memory control signals, in addition to the register access operation.

Specifically, referring to FIG. 11, the PIM device 200 may include a memory circuit 210, a register 220, and an arithmetic circuit 230. The PIM device 200 may further include a command/address processing circuit 240 and a mode register 250. The PIM device 200 may operate in a memory mode or in an arithmetic mode. The PIM device 200 may perform a memory read operation, a memory write operation, a register access operation, and an arithmetic operation. The memory read operation may be an operation of outputting read data stored in the memory circuit 210 to outside (e.g., a host or controller) of the PIM device 200. The memory write operation may be an operation of storing write data input from the outside (e.g., a host or controller) of the PIM device 200 in the memory circuit 210. The register access operation may be an operation of storing data used in the arithmetic operation in the register 220, an operation of storing arithmetic result data in the register 220, or an operation of providing the data stored in the register 220 to the arithmetic circuit 230. The arithmetic operation may be an operation in which the memory circuit 210 and the register 220 provide arithmetic data to the arithmetic circuit 230, and the arithmetic circuit 230 performs the arithmetic using the provided arithmetic data to generate the arithmetic result data. The arithmetic operation may further include the operation of providing the generated arithmetic result data to the register 220. The memory read operation and memory write operation of the PIM device 200 may be performed in both memory mode and arithmetic mode. The register access operation and arithmetic operation of the PIM device 200 may be performed in the arithmetic mode. The memory read operation, the memory write operation, the register access operation, and the arithmetic operation of the PIM device 200 may all be performed by the memory control signal CTRL_M. However, the type of the operation performed in the arithmetic circuit 230 may be determined by the arithmetic control signal CTRL_A. Accordingly, in an embodiment, a separate control signal for performing the access operation to the register 220 and a separate control signal for performing the arithmetic operation in the arithmetic circuit 230 might not be required.

In an embodiment, the memory circuit 210 may be a DRAM device. The memory circuit 210 may include a plurality of memory banks. Each of the plurality of memory banks may include a plurality of memory cells arranged at intersections of a plurality of rows and a plurality of columns. In an embodiment, each of the plurality of memory cells may be specified by a memory address ADDR_M. In an embodiment, the memory address ADDR_M may include a bank address, a row address, and a column address. The plurality of memory banks may be respectively specified by the plurality of bank addresses. The plurality of rows may be respectively specified by the plurality of row addresses. In addition, the plurality of columns may be respectively specified by the plurality of column addresses.

The memory circuit 210 may receive the memory control signal CTRL_M from the command/address processing circuit 240. In addition, the memory circuit 210 may receive the memory address ADDR_M or the remaining memory address ADDR_MR from the command/address processing circuit 240. The memory address ADDR_M may be the same as described with reference to FIG. 1. Accordingly, each of the plurality of memory addresses ADDR_Ms may be composed of one bank address from the plurality of bank addresses, one row address from the plurality of row addresses, and at least one column address from the plurality of column addresses. In the present embodiment, the remaining memory address ADDR_MR may be defined as one of the remaining memory addresses ADDR_Ms except first and second temporary memory addresses ADDR_T1 and ADDR_T2 allocated among all memory addresses ADDR_Ms included in the memory address space in the arithmetic mode. The memory control signal CTRL_M may be a read control signal CTRL_R or a write control signal CTRL_W.

The memory circuit 210 may, in the memory mode, receive the memory control signal CTRL_M and the memory address ADDR_M from the command/address processing circuit 240. In the memory mode, the memory circuit 210 may be accessed by the memory control signal CTRL_M and the memory address ADDR_M. In an embodiment, the memory circuit 210 may, in the memory mode, perform the memory read operation of outputting read data stored in the memory cells designated by the memory address ADDR_M to the outside of the PIM device 200 in response to the read control signal CTRL_R. In an embodiment, the memory circuit 210 may, in the memory mode, perform the memory write operation of storing write data in the memory cells designated by the memory address ADDR_M in response to the write control signal CTRL_W. In an embodiment, the write data may be data used in the arithmetic operation performed in the arithmetic circuit 230. In the memory mode, in the process in which the memory read operation or the memory write operation is performed in the memory circuit 210, the memory address ADDR_M transmitted to the memory circuit 210 may be one of all memory addresses ADDR_Ms allocated to the memory address space, as described with reference to FIG. 2.

The memory circuit 210 may perform the memory read operation and the memory write operation even in the arithmetic mode. In addition, the memory circuit 210 may, in the arithmetic mode, perform an operation of providing the first input data DA_IN1 used for the arithmetic operation in the arithmetic circuit 230 to the arithmetic circuit 230. The memory read operation and the memory write operation in the arithmetic mode may be performed in the similar manner to the memory read operation and the memory write operation in the memory mode. That is, in the arithmetic mode, when the memory control signal CTRL_M and the remaining memory address ADDR_MR are transmitted from the command/address processing circuit 240, the memory circuit 210 may perform the memory read operation or the memory write operation in the similar manner as in the memory mode. However, in the arithmetic mode, the remaining memory address ADDR_MR transmitted from the command/address processing circuit 240 to the memory circuit 210 may be different from the remaining memory address transmitted to the memory circuit 110 of the PIM device 100 of FIG. 1 in the arithmetic mode in that the remaining memory address ADDR_MR transmitted from the command/address processing circuit 240 to the memory circuit 210 is one of the remaining memory addresses ADDR_MRs except the first and second temporary memory addresses ADDR_T1 and ADDR_T2 among all memory addresses ADDR_Ms allocated to the memory address space.

In an embodiment, the memory circuit 210 may, in the arithmetic mode, perform the memory read operation of outputting the read data stored in the memory cells designated by the remaining memory address ADDR_MR in response to the read control signal CTRL_R among the memory control signals CTRL_M. In an embodiment, the memory circuit 210 may, in the arithmetic mode, perform the memory write operation of storing the write data in the memory cells designated by the remaining memory address ADDR_MR in response to the write control signal CTRL_W. In an embodiment, the memory circuit 210 may, in the arithmetic mode, receive the arithmetic control signal CTRL_A from the command/address processing circuit 240. In this case, the memory circuit 210 may transmit the first input data DA_IN1 to the arithmetic circuit 230 in response to the subsequently transmitted memory control signal CTRL_M. Specifically, after the arithmetic control signal CTRL_A is transmitted from the command/address processing circuit 240, the memory circuit 210 may receive the memory control signal CTRL_M (e.g., the read control signal CTRL_R or the write control signal CTRL_W) and the remaining memory address ADDR_MR from the command/address processing circuit 240. The memory circuit 210 may transmit the first input data DA_IN1 stored in the memory cells designated by the remaining memory address ADDR_MR to the arithmetic circuit 230 in response to the memory control signal CTRL_M. Here, the first input data DA_IN1 may be some of the data used in the arithmetic operation performed in the arithmetic circuit 230.

The register 220 may store some of the arithmetic data used in the arithmetic operation, for example, the second input data DA_IN2. The register 220 may provide the second input data DA_IN2 to the arithmetic circuit 230. In addition, the register 220 may store arithmetic result data DA_RESULT output from the arithmetic circuit 230. In an embodiment, the register 220 may include a plurality of flip-flops that provide a plurality of storage spaces. The plurality of storage spaces of the register 220 may be specified by a specified address included in the memory address, for example, a column address.

The register 220 may, in the arithmetic mode, be accessed based on the memory control signal CTRL_M and the first temporary memory address ADDR_T1. In an embodiment, the register 220 may, in the arithmetic mode, receive the memory control signal CTRL_M (e.g., the write control signal CTRL_W) and the first temporary memory address ADDR_T1 from the command/address processing circuit 240. In this case, the register 220 may store the second input data DA_IN2 in the storage regions designated by the remaining address ADDR_MR in response to the memory control signal CTRL_M. Like the first input data DA_IN1, the second input data DA_IN2 may also be some of the data used in the arithmetic operation performed in the arithmetic circuit 230. In an embodiment, the register 220 may, in the arithmetic mode, receive the arithmetic control signal CTRL_A from the command/address processing circuit 240. In this case, the register 220 may transmit the second input data DA_IN2 to the arithmetic circuit 230 in response to the subsequently transmitted memory control signal CTRL_M.

Specifically, after the arithmetic control signal CTRL_A is transmitted from the command/address processing circuit 240, the register 220 may receive the memory control signal CTRL_M (e.g., the read control signal CTRL_R or the write control signal CTRL_W) and the remaining memory address ADDR_MR from the command/address processing circuit 240. The register 220 may transmit the second input data DA_IN2 stored in the storage regions designated by the remaining address ADDR_MR (particularly, the column address included in the remaining memory address) to the arithmetic circuit 230 in response to the memory control signal CTRL_M.

In an embodiment, the register 220 may, in the arithmetic mode, receive the arithmetic control signal CTRL_A from the command/address processing circuit 240. In this case, the register 220 may store the arithmetic result data DA_RE-SULT transmitted from the arithmetic circuit 230 in response to the subsequently transmitted memory control signal CTRL_M. Specifically, after the arithmetic control signal CTRL_A is transmitted from the command/address processing circuit 240, the register 220 may receive the memory control signal CTRL_M (e.g., the read control signal CTRL_R or write control signal CTRL_W) from the command/address processing circuit 240. The register 220 may store the arithmetic result data DA_RESULT transmitted from the arithmetic circuit 230 in the storage region designated by the remaining memory address ADDR_MR in response to the memory control signal CTRL_M. In this way, the register 220 might not be accessed by a separate command CMD (or control signal) for register access, but may be accessed by the memory control signal CTRL_M generated from the command CMD used for memory access. Therefore, in an embodiment, the host or controller controlling the PIM device 200 might not need to have a separate command set for accessing the register 220.

The arithmetic circuit 230 may sequentially receive the arithmetic control signal CTRL_A and the memory control signal CTRL_M from the command/address processing circuit 240. The type of the arithmetic operation performed in the arithmetic circuit 230 may be determined by the arithmetic control signal CTRL_A. In addition, the arithmetic operation in the arithmetic circuit 230 may be performed in response to the memory control signal CTRL_M. In an embodiment, the arithmetic circuit 230 may be a multiplication and accumulation (MAC) circuit, but is not limited thereto. A case where the operation performed in the arithmetic circuit 230 is determined to be a MAC operation by the arithmetic control signal CTRL_A transmitted from the command/address processing circuit 240 will be taken as an example. In this case, the arithmetic circuit 230 may, in the arithmetic mode, receive the first input data DA_IN1 and the second input data DA_IN2 from the memory circuit 210 and the register 220, respectively, in response to the memory control signal CTRL_M (e.g., the read control signal CTRL_R or the write control signal CTRL_W) transmitted subsequent to the operation control signal CTRL_A, and perform a MAC arithmetic operation using the first input data DA_IN1 and the second input data DA_IN2. A case where the arithmetic operation performed in the arithmetic circuit 230 is determined as an operation of outputting MAC result data and storing the MAC result data in the register 220 by the arithmetic control signal CTRL_A transmitted from the command/address processing circuit 240. In this case, the arithmetic circuit 230 may, in the arithmetic mode, transmit the arithmetic result data DA_RESULT generated by the arithmetic operation to the register 220 in response to the memory control signal CTRL_M (e.g., the read control signal CTRL_R or write control signal CTRL_W) transmitted subsequent to the arithmetic control signal CTRL_A.

The command/address processing circuit 240 may receive the command CMD and address ADDR from, for example, a host or controller. In an embodiment, the address ADDR transmitted to the command/address processing circuit 240 may include a mode setting information MRS. The command/address processing circuit 240 may process the command CMD to generate and output the memory control signal CTRL_M or the arithmetic control signal CTRL_A. In an embodiment, when the command CMD is a read command, the command/address processing circuit 240 may generate and output the read control signal CTRL_R as the memory control signal CTRL_M. When the command CMD is a write command, the command/address processing circuit 240 may generate and output the write control signal CTRL_W as the memory control signal CTRL_M.

The operation of generating and outputting the memory control signal CTRL_M in the command/address processing circuit 240 may be performed in the same manner in the memory mode and in the arithmetic mode. However, the object to which the command/address processing circuit 240 transmits the memory control signal CTRL_M may be different in the memory mode and in the arithmetic mode. Specifically, in the memory mode, the command/address processing circuit 240 may transmit the memory control signal CTRL_M to the memory circuit 210, but might not transmit the memory control signal CTRL_M to the register 220 and the arithmetic circuit 230. On the other hand, in the arithmetic mode, the command/address processing circuit 240 may transmit the memory control signal CTRL_M to the memory circuit 210, the register 220, or the arithmetic circuit 230 depending on whether the memory address ADDR_M corresponds to the first and second temporary memory addresses ADDR_T1 and ADDR_T2. Specifically, in the arithmetic mode, when the memory address ADDR_M is neither the first temporary memory address ADDR_T1 nor the second temporary memory address ADDR_T2 (i.e., when the memory address ADDR_M is the remaining memory address ADDR_MR), the command/address processing circuit 240 may transmit the memory control signal CTRL_M to the memory circuit 210. In the arithmetic mode, when the memory address ADDR_M is the first temporary address ADDR_T1, the command/address processing circuit 240 may transmit the memory control signal CTRL_M to the register 220. In the arithmetic mode, when the memory address ADDR_M is the second temporary address ADDR_T2, the command/address processing circuit 240 may transmit the arithmetic control signal CTRL_A to the memory circuit 210, the register 220, and the arithmetic circuit 230, and also transmit the subsequently transmitted memory control signal CTRL_M to the memory circuit 210, the register 220, and the arithmetic circuit 230.

The command/address processing circuit 240 may, in the memory mode, latch the address ADDR and output the latched address ADDR as the memory address ADDR_M. In the memory mode, the command/address processing circuit 240 may transmit the memory address ADDR_M to the memory circuit 210. The command/address processing circuit 240 may, in the arithmetic mode, latch the address ADDR and output the latched address ADDR as the first temporary memory address ADDR_T1, as the second temporary memory address ADDR_T2, or as the remaining memory address ADDR_MR. Specifically, in the arithmetic mode, when the address ADDR transmitted to the command/address processing circuit 240 is the first temporary memory address ADDR_T1, the command/address processing circuit 240 may transmit the first temporary memory address ADDR_T1 to the register 220 along with the memory control signal CTRL_M. In the arithmetic mode, when the address ADDR transmitted to the command/address processing circuit 240 is the second temporary memory address ADDR_T2, the command/address processing circuit 240 may transmit the arithmetic control signal CTRL_A to the memory circuit 210, the register 220, and the arithmetic circuit 230. In this case, the command/address processing circuit 240 may subsequently transmit the remaining memory address ADDR_MR along with the memory control signal CTRL_M to the memory circuit 210 and the register 220. In the arithmetic mode, when the address ADDR transmitted to the command/address processing circuit 240 corresponds to the remaining memory address ADDR_MR except the first temporary memory address ADDR_T1 and the second temporary memory address ADDR_T2, the command/address processing circuit 240 may transmit the remaining memory address ADDR_MR to the memory circuit 210 or the register 220.

When the address ADDR transmitted from the command/address processing circuit 240 includes the mode setting information MRS, the command/address processing circuit 240 may transmit the mode signal MODE corresponding to the mode setting information MRS to the mode register 250. When the mode setting information MRS includes activation of the memory mode, the command/address processing circuit 240 may transmit the memory mode signal as the mode signal MODE to the mode register 250. On the other hand, when the mode setting information MRS includes activation of the arithmetic mode, the command/address processing circuit 240 may transmit the arithmetic mode signal as the mode signal MODE to the mode register 250. When transmitting the memory mode signal as the mode signal MODE to the mode register 250, the command/address processing circuit 240 may continue to operate in the memory mode until transmitting the arithmetic mode signal as the next mode signal MODE to the mode register 250. Similarly, when transmitting the operation mode signal as the mode signal (MODE) to the mode register 250, the command/address processing circuit 240 may continue to operate in the arithmetic mode until transmitting the memory mode signal as the next mode signal MODE to the mode register 250. When the mode signal MODE is the arithmetic mode signal, the command/address processing circuit 240 may receive the first and second temporary memory addresses ADDR_T1 and ADDR_T2 from the mode register 250. Accordingly, in the arithmetic mode, the command/address processing circuit 240 may determine whether the address ADDR corresponds to the first and second temporary memory addresses ADDR_T1 and ADDR_T2 or the remaining memory address ADDR_MR.

The mode register 250 may set the operation mode of the PIM device 200. The operation mode may be the memory mode or the arithmetic mode. The mode register 250 may set the operation mode of the PIM device 200, based on the mode signal MODE transmitted from the command/address processing circuit 240. In an embodiment, when the memory mode signal is transmitted as the mode signal MODE from the command/address processing circuit 240, the mode register 250 may switch the operation mode from the existing arithmetic mode to the memory mode. When the arithmetic mode signal is transmitted as the mode signal MODE from the command/address processing circuit 240, the mode register 250 may switch the operation mode from the existing memory mode to the arithmetic mode. In this case, the mode register 250 may transmit the first and second temporary memory addresses ADDR_T1 and ADDR_T2 to the command/address processing circuit 240. In an embodiment, the first and second temporary memory addresses ADDR_T1 and ADDR_T2 may be set in the mode register 250 in advance. In an embodiment, the first and second temporary memory addresses ADDR_T1 and ADDR_T2 may be memory addresses having specific first and second row addresses, respectively, allocated among all memory addresses ADDR_Ms included in the memory address space.

Figure 12:
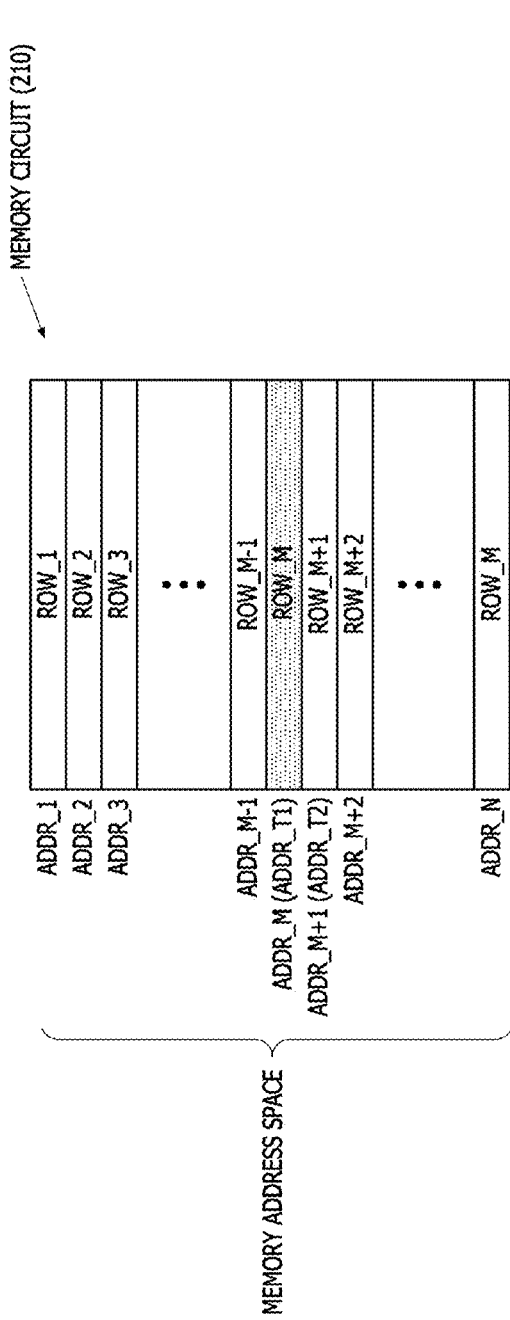
FIG. 12 is a diagram illustrating a configuration of a memory address space when the PIM device of FIG. 11 operates in the arithmetic mode.

FIG. 12 is a diagram illustrating a configuration of a memory address space when the PIM device 200 of FIG. 11 operates in the arithmetic mode. The configuration of the memory address space when the PIM device 200 operates in the memory mode is the same as that described with reference to FIG. 2. Accordingly, the description thereof will be omitted below.

Referring to FIG. 12, when the PIM device (200 in FIG. 11) operates in the arithmetic mode, among all memory addresses allocated to the memory address space, that is, the first to "N"$^{th}$ memory addresses ADDR_1-ADDR_N, one memory address, for example, the "M"$^{th}$ memory address ADDR_M including the "M"$^{th}$ row address, may be designated as the first temporary memory address ADDR_T1. That is, the "M"$^{th}$ memory address ADDR_M may commonly include the "M"$^{th}$ row address even when the bank address and column address are different. In this case, among the first to "N"$^{th}$ rows ROW_1-ROW_N of the memory circuit 110, the "M"$^{th}$ row ROW_M specified by the "M"$^{th}$ memory address ADDR_M may be deactivated. In addition, among all the memory addresses allocated to the memory address space, that is, the first to "N"$^{th}$ memory addresses ADDR_1-ADDR_N, another memory address, for example, the "M+1"$^{th}$ memory address ADDR_M+1 including the "M+1"$^{th}$ row address, may be designated as the second temporary memory address ADDR_T2. That is, the "M+1"$^{th}$ memory address ADDR_M+1 may commonly include the "M+1"$^{th}$ row address even when the bank address and column address are different. In this case, the "M+1"$^{th}$ row ROW_M+1 specified by the "M+1"$^{th}$ memory address ADDR_M+1 among the first to "N"$^{th}$ rows ROW_1-ROW_N of the memory circuit 210 may be deactivated. Accordingly, among all the memory addresses allocated to the memory address space, that is, the first to "N"$^{th}$ memory addresses ADDR_1-ADDR_N, by the remaining memory addresses (ADDR_MRS in FIG. 11) except the "M"$^{th}$ memory address ADDR_M designated as the first temporary memory address ADDR_T1 and the "M+1"$^{th}$ memory address ADDR_M+1 designated as the second temporary memory address ADDR_T2, that is, the first to "M−1"$^{th}$ memory addresses ADDR_1-ADDR_M−1 and the "M+2"$^{th}$ to the "N"$^{th}$ memory addresses ADDR_M+2-ADDR_N, the first to "M−1"$^{th}$ rows ROW_1-ROW_M−1 and the "M+2"$^{th}$ to "N"$^{th}$ rows ROW_M+2-ROW_N of the memory circuit 210 may be respectively specified.

The read operation and write operation in the memory mode of the PIM device 200 of FIG. 11 may be performed in the same manner as the read operation and write operation in the memory mode of the PIM device (100 in FIG. 1) described with reference to FIGS. 4 and 5, respectively. In addition, the read operation and write operation in the arithmetic mode of the PIM device 200 of FIG. 11 may be performed in the same manner as the read operation and write operation in the arithmetic mode of the PIM device (100 in FIG. 1) described with reference to FIGS. 8 and 9, respectively. However, in this case, the read operation and write operation in the arithmetic mode of the PIM device 200 in FIG. 11 may be different from the read operation and write operation in the arithmetic mode of the PIM device (100 in FIG. 1) described with reference to FIGS. 8 and 9, respectively, in that the address transmitted from the command/address processing circuit 240 to the memory circuit 210 is one of the remaining memory addresses (ADDR_MRs in FIG. 11) except the "M"$^{th}$ and "M+1"$^{th}$ memory addresses ADDR_M and ADDR_M+1, which are respectively designated as the first and second temporary memory addresses ADDR_T1 and ADDR_T2, among the first to "N"$^{th}$ memory addresses ADDR_1-ADDR_N of FIG. 12, that is, the first to "M−1"$^{th}$ memory addresses ADDR_1-ADDR_M−1 and the "M+2"$^{th}$ to "N"$^{th}$ memory addresses ADDR_M+2-ADDR_N.

Figure 13:
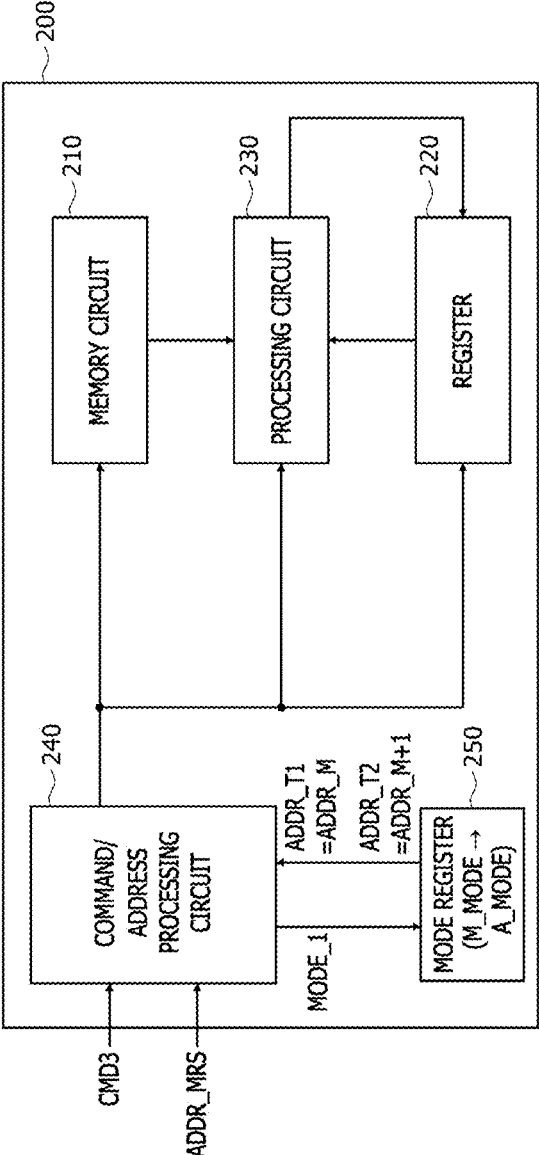
FIG. 13 is a block diagram illustrating a process in which the operation mode of the PIM device of FIG. 11 is changed from the memory mode to the arithmetic mode.

FIG. 13 is a block diagram illustrating a process in which the operation mode of the PIM device 200 of FIG. 11 is changed from the memory mode to the arithmetic mode. In FIG. 13, the same reference numerals as in FIG. 11 indicate the same components.

Referring to FIG. 13, in a state in which the current operation mode of the mode register 250 is set to the memory mode M_MODE, when a third command CMD3 requesting mode change and the memory address ADDR_MRS including mode setting information are transmitted, the command/address processing circuit 240 may transmit a first mode signal MODE_1 to the mode register 250. The mode register 250 may change the operation mode from the memory mode M_MODE currently stored in the mode register 250 to the arithmetic mode A_MODE, in response to the first mode signal MODE_1. In addition, the mode register 250 may transmit the "M"$^{th}$ memory address ADDR_M including the "M"$^{th}$ row address and the "M+1"$^{th}$ memory address ADDR_M+1 as the first temporary memory address ADDR_T1 and the second temporary memory address ADDR_T2, respectively, to the command/address processing circuit 240. The command/address processing circuit 240 may process subsequently transmitted commands and addresses in the changed operation mode, that is, in the arithmetic mode. In the arithmetic mode, as described with reference to FIG. 12, the memory address space may be changed into a state where the "M"$^{th}$ memory address ADDR_M, which specifies the "M"$^{th}$ row ROW_M of the memory circuit 210, is allocated as the first temporary memory address ADDR_T1, and the "M+1"$^{th}$ memory address ADDR_M+1, which specifies the "M+1"$^{th}$ row ROW_M+1 of the memory circuit 210, is allocated as the second temporary memory address ADDR_T2.

Figure 14:
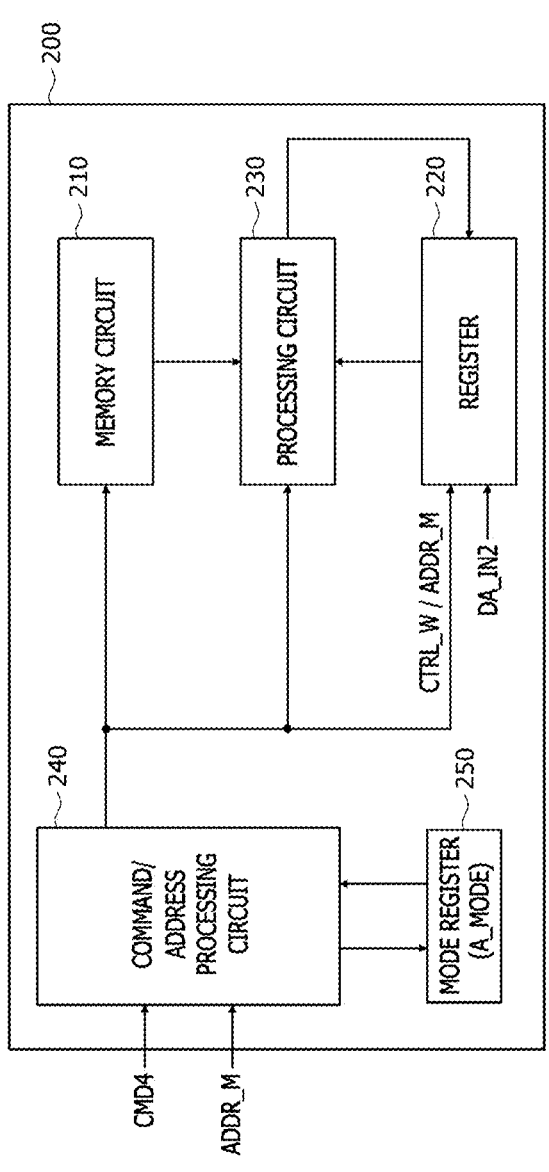
FIG. 14 is a block diagram illustrating a register access operation in the arithmetic mode of the PIM device of FIG. 11.

FIG. 14 is a block diagram illustrating a register access operation in the arithmetic mode of the PIM device 200 of FIG. 11. In FIG. 14, the same reference numerals as in FIG. 11 indicate the same components. In the present embodiment, it is assumed that the operation mode in the mode register 250 is set to the arithmetic mode A_MODE. Accordingly, the command/address processing circuit 240 may perform the command and address processing in the arithmetic mode. As described with reference to FIG. 12, in the arithmetic mode, the first to "M−1"$^{th}$ rows ROW_1-ROW_M−1 and the "M+1"$^{th}$ to "N"$^{th}$ rows ROW_M+1-ROW_N of the memory circuit 210 may be respectively specified by the remaining memory addresses (ADDR_MRs in FIG. 11) except the "M"$^{th}$ memory address ADDR_M, which is the first temporary memory address ADDR_T1, and the "M+1"$^{th}$ memory address ADDR_M+1, which is the second temporary memory address ADDR_T2, that is, the first to "M−1"$^{th}$ memory addresses ADDR_1-ADDR_M−1 and the "M+1"$^{th}$ to "N"$^{th}$ memory addresses ADDR_M+1-ADDR_N.

Referring to FIG. 14, in the arithmetic mode in which the arithmetic mode A_MODE is set in the mode register 250 as the operation mode, when a fourth command CMD4 requesting a write operation and the "M"$^{th}$ memory address ADDR_M including the "M"$^{th}$ row address are transmitted, the command/address processing circuit 240 may output the write control signal CTRL_W corresponding to the fourth command CMD4 as the memory control signal (CTRL_M in FIG. 11). Because the "M"$^{th}$ memory address ADDR_M corresponds to the first temporary memory address ADDR_T1, the command/address processing circuit 240 may transmit the write control signal CTRL_W to the register 220 rather than the memory circuit 210. The command/address processing circuit 240 may latch the "M"$^{th}$ memory address ADDR_M, and then transmit the latched "M"$^{th}$ memory address ADDR_M to the register 220. The register 220 may store the second input data DA_IN2 transmitted from outside of the PIM device 200. In an embodiment, the storage region in the register 220 where the second input data DA_IN2 is stored may be specified by a column address included in the "M"$^{th}$ memory address ADDR_M.

Figure 15:
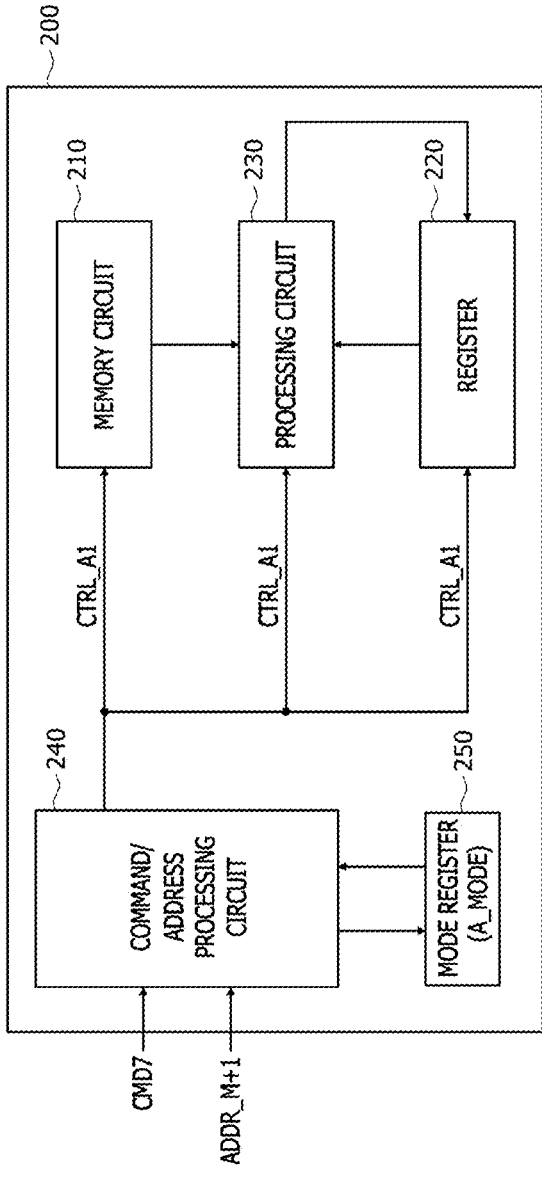
FIGS. 15 and 16 are block diagrams illustrating an example of the operation in the arithmetic mode of the PIM device of FIG. 11.
Figure 16:
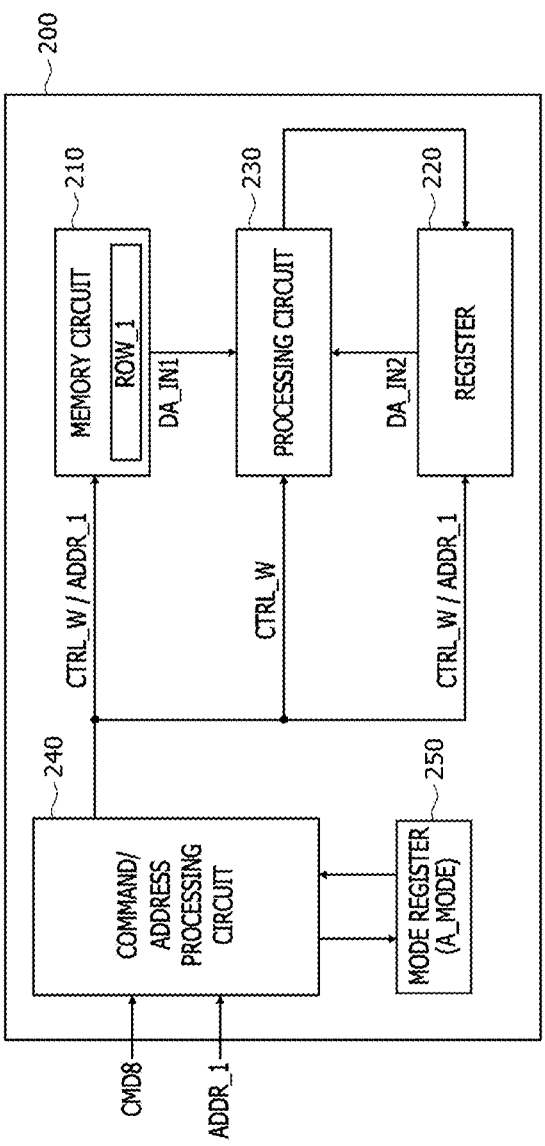

FIGS. 15 and 16 are block diagrams illustrating an example of the operation in the arithmetic mode of the PIM device 200 of FIG. 11. In FIGS. 15 and 16, the same reference numerals as in FIG. 11 indicate the same components. In the present example as well, it is assumed that the operation mode in the mode register 250 is set to the arithmetic mode A_MODE. Accordingly, the command/address processing circuit 240 may perform the command and address processing in the arithmetic mode. In the arithmetic mode, the first to "M−1"$^{th}$ rows ROW_1-ROW_M−1 and the "M+1"$^{th}$ to "N"$^{th}$ rows ROW_M+1-ROW_N of the memory circuit 210 may be respectively specified by the remaining memory addresses (ADDR_MRS in FIG. 11) except the "M"$^{th}$ memory address ADDR_M, which is the first temporary memory address ADDR_T1, and the "M+1"$^{th}$ memory address ADDR_M+1, which is the second temporary memory address ADDR_T2, that is, the first to "M−1"$^{th}$ memory addresses ADDR_1-ADDR_M−1 and the "M+1"$^{th}$ to "N"$^{th}$ memory addresses ADDR_M+1-ADDR_N.

First, referring to FIG. 15, the command/address processing circuit 240 may receive a seventh command CMD7 requesting the write operation and the "M+1"$^{th}$ memory address ADDR_M+1 including the "M+1"$^{th}$ row address. In this case, because the "M+1"$^{th}$ memory address ADDR_M+1 corresponds to the second temporary memory address ADDR_T2, the command/address processing circuit 240 may generate a first arithmetic control signal CTRL_A1 to transmit the first arithmetic control signal CTRL_A1 to the memory circuit 210, the register 220, and the arithmetic circuit 230. In the present example, it is assumed that the first arithmetic control signal CTRL_A1 is the control signal that specifies a MAC arithmetic operation in the arithmetic circuit 230. After outputting the first arithmetic control signal CTRL_A1, the command/address processing circuit 240 may wait until the next command and address are transmitted.

Next, referring to FIG. 16, the command/address processing circuit 240 may receive an eighth command CMD8 requesting a write operation and the first memory address ADDR_1 including the first row address. Previously, as the first operation control signal CTRL_A1 is generated and output, the command/address processing circuit 240 may output the write control signal CTRL_W corresponding to the eighth command CMD8 as the memory control signal (CTRL_M in FIG. 11). The command/address processing circuit 240 may transmit the write control signal CTRL_W to the memory circuit 210, the register 220, and the arithmetic circuit 230. The command/address processing circuit 240 may latch the first memory address ADDR_1, and then transmit the latched first memory address ADDR_1 to the memory circuit 210 and the register 220. The memory circuit 210 may transmit the first input data DA_IN1 stored in the first row ROW_1 specified by the first memory address ADDR_1 to the arithmetic circuit 230, in response to the write control signal CTRL_W. Similarly, the register 220 may transmit the second input data DA_IN2 stored in the storage region specified by the first memory address ADDR_1 to the arithmetic circuit 230, in response to the write control signal CTRL_W. The arithmetic circuit 230 may perform the arithmetic operation using the first input data DA_IN1 and the second input data DA_IN2 transmitted from the memory circuit 210 and the register 220, respectively, in response to the write control signal CTRL_W.

Figure 17:
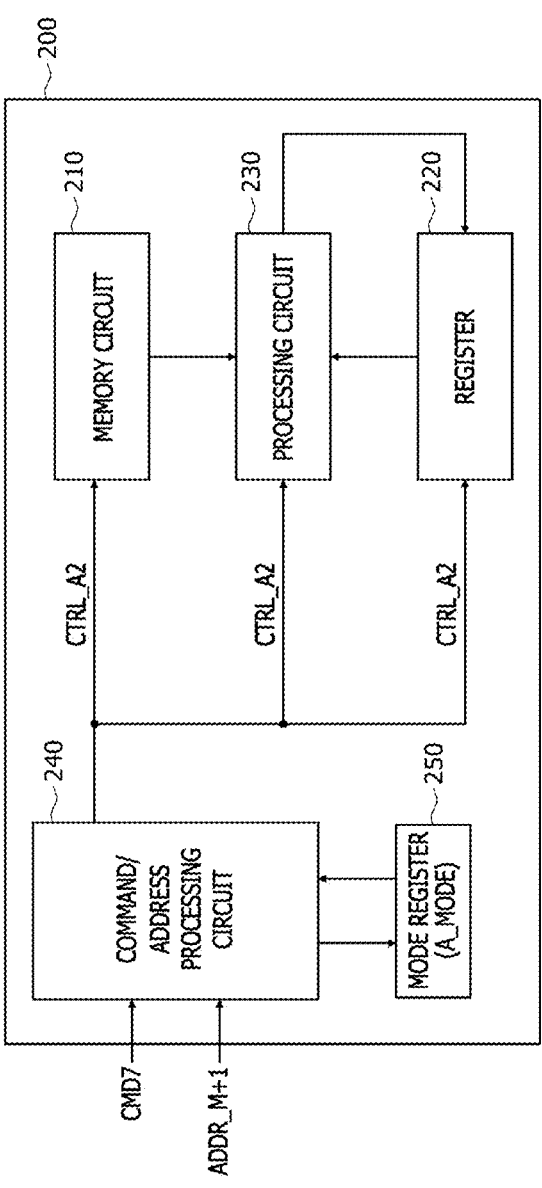
FIGS. 17 and 18 are block diagrams illustrating another example of the operation in the arithmetic mode of the PIM device of FIG. 11.
Figure 18:
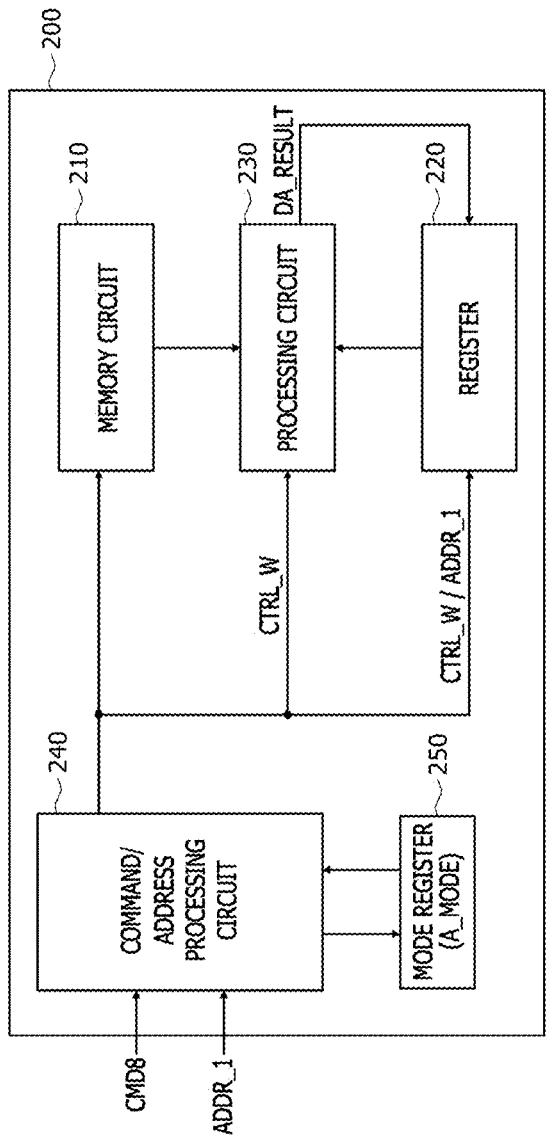

FIGS. 17 and 18 are block diagrams illustrating another example of the operation in the arithmetic mode of the PIM device 200 of FIG. 11. In FIGS. 17 and 18, the same reference numerals as in FIG. 11 indicate the same components. In the present example as well, it is assumed that the operation mode in the mode register 250 is set to the arithmetic mode A_MODE. Accordingly, the command/address processing circuit 240 may perform the command and address processing in the arithmetic mode. In the arithmetic mode, the first to "M−1"$^{th}$ rows ROW_1-ROW_M−1 and the "M+1"$^{th}$ to "N"$^{th}$ rows ROW_M+1-ROW_N of the memory circuit 210 may be respectively specified by the remaining memory addresses (ADDR_MRS in FIG. 11) except the "M"$^{th}$ memory address ADDR_M, which is the first temporary memory address ADDR_T1, and the "M+1"$^{th}$ memory address ADDR_M+1, which is the second temporary memory address ADDR_T2, that is, the first to "M−1"$^{th}$ memory addresses ADDR_1-ADDR_M−1 and the "M+1"$^{th}$ to "N"$^{th}$ memory addresses ADDR_M+1-ADDR_N.

First, referring to FIG. 17, the command/address processing circuit 240 may receive the seventh command CMD7 requesting the write operation and the "M+1"$^{th}$ memory address ADDR_M+1 including the "M+1"$^{th}$ row address. In this case, because the "M+1"$^{th}$ memory address ADDR_M+1 corresponds to the second temporary memory address ADDR_T2, the command/address processing circuit 240 may generate a second arithmetic control signal CTRL_A2 to transmit the second arithmetic control signal CTRL_A2 to the memory circuit 210, the register 220, and the arithmetic circuit 230. In the present example, it is assumed that the second arithmetic control signal CTRL_A2 is a control signal that specifies the operation of storing the arithmetic result data DA_RESULT generated in the arithmetic circuit 230 in a register. After outputting the second arithmetic control signal CTRL_A2, the command/address processing circuit 240 may wait until the next command and address are transmitted.

Next, referring to FIG. 18, the command/address processing circuit 240 may receive the eighth command CMD8 requesting the write operation and the first memory address ADDR_1 including the first row address. The command/address processing circuit 240 may output the write control signal CTRL_W corresponding to the eighth command CMD8 as the memory control signal (CTRL_M in FIG. 11). Previously, as the second arithmetic control signal CTRL_A2 designating the storing operation of the arithmetic result data DA_RESULT is generated and output, the command/address processing circuit 240 may transmit the write control signal CTRL_W to the register 220 and the arithmetic circuit 230. The command/address processing circuit 240 may latch the first memory address ADDR_1, and then transmit the latched first memory address ADDR_1 to the register 220. The arithmetic circuit 230 may output the arithmetic result data DA_RESULT in response to the write control signal CTRL_W to transmit the arithmetic result data DA_RESULT to the register 220. The register 220 may store the arithmetic result data DA_RESULT in a storage region designated by the first memory address ADDR_1, in response to the write control signal CTRL_W.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A processing-in-memory (PIM) device comprising:
a memory circuit including a plurality of memory cells, the memory circuit configured to designate the plurality of memory cells by a plurality of memory addresses, wherein the plurality of memory addresses are allocated to a memory address space in a memory mode;
a register configured to be accessed based on a temporary memory address allocated among the plurality of memory addresses in an arithmetic mode; and
an arithmetic circuit configured to perform an arithmetic operation using first and second input data to generate arithmetic result data.

2. The processing-in-memory (PIM) device of claim 1, wherein the plurality of memory addresses include physical addresses that specify each data storage region of all data storage regions of the memory circuit.

3. The processing-in-memory (PIM) device of claim 1, wherein the memory circuit is:
accessed by one memory address among the plurality of memory addresses and a memory control signal, in the memory mode, and
accessed by a remaining memory address that is one of the memory addresses except the temporary memory address among the plurality of memory addresses and the memory control signal, or by the remaining memory address and an arithmetic control signal, in the arithmetic mode.

4. The processing-in-memory (PIM) device of claim 3, wherein the memory control signal is a read control signal or a write control signal, and
wherein the memory circuit is configured to:
output first read data stored in the memory cells designated by the memory address to an outside of the processing-in-memory device in response to the read control signal, in the memory mode,
store first write data in the memory cells designated by the memory address in response to the write control signal, in the memory mode,
output second read data stored in the memory cells designated by the remaining memory address to the outside of the processing-in-memory device in response to the read control signal, in the arithmetic mode,
store second write data in the memory cells designated by the remaining memory address in response to the write control signal, in the arithmetic mode, and
transmit the first input data stored in the memory cells designated by the memory address to the arithmetic circuit in response to the arithmetic control signal, in the arithmetic mode.

5. The processing-in-memory (PIM) device of claim 3, wherein the arithmetic circuit is configured to perform the arithmetic operation in response to the arithmetic control signal.

6. The processing-in-memory (PIM) device of claim 3, wherein the register is accessed based on the memory control signal and the temporary memory address, in the arithmetic mode.

7. The processing-in-memory (PIM) device of claim 6,
wherein the memory control signal is a read control signal or a write control signal, and
wherein the register is configured to:
store the second input data in the storage regions designated by the temporary memory address in response to the write control signal, in the arithmetic mode, and
transmit the second input data stored in the storage regions designated by the temporary memory address in response to the arithmetic control signal, in the arithmetic mode.

8. The processing-in-memory (PIM) device of claim 1, further comprising a command and address (command/address) processing circuit configured to receive commands and addresses and output a memory control signal or an arithmetic control signal corresponding to the command and the address as a memory address or the temporary memory address.

9. The processing-in-memory (PIM) device of claim 8, further comprising a mode register,
wherein the mode register is configured to be set to one of the memory mode and the arithmetic mode, and
wherein when the address includes mode setting information, the command/address processing circuit is configured to transmit a mode signal corresponding to the mode setting information to the mode register.

10. The processing-in-memory (PIM) device of claim 9, wherein when an arithmetic mode signal is transmitted as the mode signal from the command/address processing circuit, the mode register is configured to allocate one of the plurality of memory addresses as the temporary memory address and transmit the allocated temporary memory address to the command/address processing circuit.

11. The processing-in-memory (PIM) device of claim 10, wherein the command/address processing circuit is configured to:
transmit the memory address and the memory control signal to the memory circuit when setting of the mode register corresponds to the memory mode, and
transmit the memory address and the memory control signal to the register when the setting of the mode register corresponds to the arithmetic mode.

12. A processing-in-memory (PIM) device comprising:

a memory circuit including a plurality of memory cells, the memory circuit configured to designate the plurality of memory cells by a plurality of memory addresses, wherein the plurality of memory addresses are allocated to a memory address space in a memory mode;

a register configured to be accessed based on a first temporary memory address allocated among the plurality of memory addresses in an arithmetic mode; and an arithmetic circuit configured to perform an arithmetic operation using first and second input data, based on a second temporary memory address allocated among the plurality of memory addresses to generate arithmetic result data, in the arithmetic mode.

13. The processing-in-memory (PIM) device of claim 12, wherein the memory circuit is configured to:

be accessed by one memory address among the plurality of memory addresses and a memory control signal, in the memory mode, and be accessed by a remaining memory address that is one of the memory addresses excluding the first temporary memory address and the second temporary memory address among the plurality of memory addresses and the memory control signal, in the arithmetic mode.

14. The processing-in-memory (PIM) device of claim 13, wherein the memory control signal is a read control signal or a write control signal, and wherein the memory circuit is configured to:

output first read data stored in the memory cells designated by the memory address to the outside of the processing-in-memory device in response to the read control signal, in the memory mode, store first write data in the memory cells designated by the memory address in response to the write control signal, in the memory mode, output second read data stored in the memory cells designated by the remaining memory address to the outside of the processing-in-memory device in response to the read control signal, in the arithmetic mode, store second write data in the memory cells designated by the remaining memory address in response to the write control signal, in the arithmetic mode, and transmit the first input data stored in the memory cells designated by the remaining memory address to the arithmetic circuit in response to an arithmetic control signal and the memory control signal, in the arithmetic mode.

15. The processing-in-memory (PIM) device of claim 13, wherein the arithmetic circuit is configured to:

perform the arithmetic operation by a first arithmetic control signal and the memory control signal, in the arithmetic mode, and perform an operation of outputting arithmetic result data by the second arithmetic control signal and the memory control signal, in the arithmetic mode.

16. The processing-in-memory (PIM) device of claim 15, wherein the register is configured to:

perform an operation of storing the second input data, based on the memory control signal and the first temporary memory address, in the arithmetic mode, transmit the second input data to the arithmetic circuit, based on the first arithmetic control signal, the memory control signal, and the remaining memory address, in the arithmetic mode, and perform an operation of storing arithmetic result data, based on the second arithmetic control signal, the memory control signal, and the remaining memory address, in the arithmetic mode.

17. The processing-in-memory (PIM) device of claim 16, wherein the register is configured to:

store the second input data in storage regions designated by the first temporary memory address in response to the memory control signal when the memory control signal and the first temporary memory address are transmitted, in the arithmetic mode, transmit the second input data stored in the storage regions designated by the remaining memory address in response to the memory control signal transmitted subsequent to the first arithmetic control signal when the first arithmetic control signal is transmitted, in the arithmetic mode, and store the arithmetic result data in the storage regions designated by the remaining memory address in response to the memory control signal transmitted subsequent to the second arithmetic control signal when the second arithmetic control signal is transmitted, in the arithmetic mode.

18. The processing-in-memory (PIM) device of claim 12, further comprising a command and address (command/address) processing circuit configured to receive a command and an address and output an arithmetic control signal or a memory control signal corresponding to the command and the address as a memory address, a remaining memory address, or the first temporary memory address, wherein the remaining memory address corresponds to one of the memory addresses excluding the first temporary memory address and the second temporary memory address among the plurality of memory addresses.

19. The processing-in-memory (PIM) device of claim 18, further comprising a mode register, wherein the mode register is configured to be set to one of the memory mode and the arithmetic mode, and wherein when the address includes mode setting information, the command/address processing circuit is configured to transmit a mode signal corresponding to the mode setting information to the mode register.

20. The processing-in-memory (PIM) device of claim 19, wherein the mode register is configured to allocate two memory addresses among the plurality of memory addresses to the first temporary memory address and the second temporary memory address and transmit the first temporary memory address and the second temporary memory address to the command/address processing circuit when an arithmetic mode signal is transmitted as the mode signal from the command/address processing circuit.

21. The processing-in-memory (PIM) device of claim 20, wherein the command/address processing circuit is configured to:

transmit the memory address and the memory control signal to the memory circuit when setting of the mode register corresponds to the memory mode, transmit the memory control signal and the first temporary memory address to the register when the setting of the mode register corresponds to the arithmetic mode and the transmitted address is the first temporary memory address, and transmit an arithmetic control signal to at least one of the memory circuit, the register, and the arithmetic circuit and transmit the memory control signal and the remaining memory address to at least one of the register and the arithmetic circuit, subsequent to the arithmetic control signal, when the setting of the mode register corresponds to the arithmetic mode and the transmitted address is the second temporary memory address.

* * * * *